(12) United States Patent
Mueller et al.

(10) Patent No.: US 9,458,281 B2
(45) Date of Patent: Oct. 4, 2016

(54) METHOD FOR THE PRODUCTION OF OXAZOLIDINONE COMPOUNDS

(71) Applicant: Bayer MaterialScience AG, Leverkusen (DE)

(72) Inventors: Thomas Ernst Mueller, Aachen (DE); Christoph Guertler, Cologne (DE); Susmit Basu, Aachen (DE); Walter Leitner, Aachen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/441,279

(22) PCT Filed: Nov. 11, 2013

(86) PCT No.: PCT/EP2013/073468
§ 371 (c)(1),
(2) Date: May 7, 2015

(87) PCT Pub. No.: WO2014/076024
PCT Pub. Date: May 22, 2014

(65) Prior Publication Data
US 2015/0291726 A1  Oct. 15, 2015

(30) Foreign Application Priority Data

Nov. 14, 2012 (EP) .................................... 12192611

(51) Int. Cl.
| | |
|---|---|
| *C08G 18/00* | (2006.01) |
| *C08G 18/75* | (2006.01) |
| *C08G 59/40* | (2006.01) |
| *C08G 18/22* | (2006.01) |
| *C08G 18/32* | (2006.01) |
| *C08G 18/71* | (2006.01) |
| *C08G 59/02* | (2006.01) |
| *C08J 3/09* | (2006.01) |
| *C08L 63/00* | (2006.01) |

(52) U.S. Cl.
CPC ........... *C08G 18/758* (2013.01); *C08G 18/003* (2013.01); *C08G 18/222* (2013.01); *C08G 18/225* (2013.01); *C08G 18/227* (2013.01); *C08G 18/3218* (2013.01); *C08G 18/71* (2013.01); *C08G 59/4028* (2013.01); *C08G 59/02* (2013.01); *C08J 3/09* (2013.01); *C08J 2400/14* (2013.01); *C08L 63/00* (2013.01)

(58) Field of Classification Search
CPC ... C08L 63/00; C08G 59/4028; C08G 59/02; C08J 3/09; C08J 2367/02; C08J 2400/14; C08J 7/047
IPC .................................................. C08G 18/003
See application file for complete search history.

(56) References Cited

U.S. PATENT DOCUMENTS

| | | |
|---|---|---|
| 3,020,262 A | 2/1962 | Speranza |
| 3,471,442 A | 10/1969 | DiLeone |
| 2010/0227090 A1 | 9/2010 | Liao et al. |

FOREIGN PATENT DOCUMENTS

| | | |
|---|---|---|
| WO | 86/06734 | 11/1986 |

OTHER PUBLICATIONS

Barros et al; Tetrahedron:Asymmetry—The first enantioselective [3+2] cycloaddition of epoxides to arylisocyanates: asymmetric synthesis of chiral oxazolidinone phosphonates; (2010): pp. 2746-2752; 21 ; Elsevier Ltd.
Zhang et al; An Efficient and Highly Regioselective Cycloaddition of Aryl Isocyanates with Oxiranes Promoted by Mgl2 Etherate; Chemical Letters; (2010); 39; pp. 527-529; The Chemical Society of Japan.
Peterson et al; Analysis of the Swain-Moseley-Bown Equation and Comparison of the Results with Nucleophilicities Derived from Halonium Ion Reactions; Journal of the American Society; Nov. 23, 1977; pp. 7968-7976; 99:24.
Dyen et al; 2-Oxazolidones; NASA Predoctoral Fellow, Temple University; (1967); pp. 197-246.
Fujiwara et al; Cycloaddition Reaction of 2, 3-Disubstituted Oxiranes with Isocyanates by Highly Activated Catalyst; Ph4Sbl-Bu3Snl; Chemistry Letters; (1986); pp. 1963-1966; The Chemical Society of Japan.
Qian et al; A Facile Synthesis of Oxazolidinones via Lanthanide-Catalyzed Cycloaddition of Epoxides with Isocyanates; SYNLETT; Feb. 1994; pp. 129-130.
Wu et al; Samarium triiodide catalyzed cycloaddition of epoxides with isocyanates : a facile synthesis of oxazolidinones; J. Indian Chem. Soc.; Jan. 2003, vol. 80; pp. 36-37.

*Primary Examiner* — Gregory Listvoyb
(74) *Attorney, Agent, or Firm* — Donald R. Palladino

(57) ABSTRACT

The present invention relates to a method for the production of oxazolidinone compounds, comprising the step of slowly reacting an isocyanate compound with an epoxide compound in the presence of a Lewis acid catalyst. The invention further relates to an oxazolidinone compound, obtainable by a method according to the invention, with a color as determined according to ASTM D1209-05 (2011) of ≤200 and a molar ratio of the oxazolidinone compound to isocyanurate by-product o/i of ≥85/15. Lastly, the invention relates to an oligomeric or polymeric oxazolidinone compound, obtainable by a method according to the invention using an isocyanate compound with two or more NCO groups per molecule and an epoxide compound with two or more epoxy groups per molecule, comprising at least two units derived from the isocyanate compound and at least two units derived from the epoxide compound, with a color as determined according to ASTM D1209-05 (2011) of ≤200.

19 Claims, 2 Drawing Sheets

METHOD FOR THE PRODUCTION OF OXAZOLIDINONE COMPOUNDS

CROSS-REFERENCE TO RELATED APPLICATION

This application is a National Phase application to PCT/EP2013/073468, filed Nov. 11, 2013 and European Application No.: 12192611.7, filed Nov. 14, 2012.

FIELD

The present invention relates to a method for the production of oxazolidinone compounds, comprising the step of reacting an isocyanate compound with an epoxide compound in the presence of a Lewis acid catalyst. The invention further relates to an oxazolidinone compound, obtainable by a method according to the invention, with a colour as determined according to ASTM D1209-05 (2011) of ≤200 and a molar ratio of the oxazolidinone compound to isocyanurate by-product o/i of ≥85/15. Lastly, the invention relates to an oligomeric or polymeric oxazolidinone compound, obtainable by a method according to the invention using an isocyanate compound with two or more NCO groups per molecule and an epoxide compound with two or more epoxy groups per molecule, comprising at least one unit derived from the isocyanate compound and at least two units derived from the epoxide compound, with a colour as determined according to ASTM D1209-05 (2011) of ≤200.

BACKGROUND

Epoxides are useful intermediates in organic synthesis because of their high reactivity. Among many chemical processes, cycloaddition reactions of epoxides with heterocumulenes are efficient methods for the synthesis of heterocyclic compounds like oxazolidinones. Oxazolidiones are widely used structural motifs in pharmaceutical applications and the cycloaddition of aromatic epoxides and isocyanates seems to be a convenient one-pot synthetic route to it. Expensive catalysts, reactive polar solvents, long reaction times and low selectivities are very common in early reports (M. E. Dyen and D. Swern, Chem. Rev., 67, 197 (1967); X. Zhang and W. Chen, Chem. Lett., 39, 527 (2010); M. T. Barros and A. M. F. Phillips, Tetrahedron: Asymmetry, 21, 2746 (2010); H.-Y. Wu, J.-C. Ding and Y.-K. Liu, J. Indian Chem. Soc., 80, 36 (2003); C. Qian and D. Zhu, Synlett, 129 (1994)). Therefore, the development of suitable catalyst systems and the identification of improved reaction conditions are desirable.

The catalytic reaction of diisocyanates with diepoxides leads to linear oligo- or polyoxazolidinones. In order for them to melt at elevated temperatures and to be useful as thermoplastics, the chemical conversion should have a high selectivity to the oxazolidinone.

With respect to catalysts, these are generally known for the reaction of isocyanates with epoxides. For example, the publication of H.-Y. Wu, J.-C. Ding and Y.-K. Liu, J. Indian Chem. Soc., 80, 36 (2003) discusses $SmI_3$ as a catalyst. However, this reaction is run with 10 mol-% of catalyst. The publication of M. Fujiwara, A. Baba, Y. Tomohisa and Haruo Matsuda, Chem. Lett. 1963-1966 (1986) describes a catalyst system of $Ph_4SbI-Bu_3SnI$. The use of organotin compounds is disadvantageous due to their toxicity. Furthermore, the catalyst concentration of 5 mol-% is rather high. As the catalyst would remain in a final polymer product, using only low amounts of catalyst is the preferred path.

U.S. Pat. No. 3,471,442 is directed towards the preparation of thermoplastic polymers by heating a solution of a diepoxide monomer dissolved in an inert organic solvent at a temperature of at least 115° C., said solvent containing a catalytic quantity of an alkali metal alkoxide. An aromatic diisocyanate is added to the aforementioned solution in small increments over a period of about one hour and heating is continued after the incremental addition of the diisocyanate has been completed until the reaction between the diepoxide and the diisocyanate is substantially completed. Thereafter, the polymeric material is separated from the solvent.

WO 86/06734 discloses a method for producing a polyoxazolidinone compound from an epoxide and an isocyanate. The reaction can be run batch-wise or continuously. However, there is no disclosure in WO 86/06734 to add the isocyanate compound to the epoxide compound continuously or step-wise.

US 2010/227090 discloses a method for producing a polyoxazolidinone from an epoxide and an isocyanate. The reaction is catalysed by 2-phenyl imidazole. There is no disclosure to use Lewis acids as catalysts.

U.S. Pat. No. 3,020,262 discloses a method for producing 2-oxazolidinones from epoxides and isocyanates in the presence of trialkylamines, alkali metal halides and ammonium halides.

It would be desirable to identify reaction conditions, which lead to oxazolidinones and polyoxazolidinones with a higher selectivity, which employ less catalyst and which avoid the use of toxic (co-)catalysts. In accordance with a lower catalyst loading and a higher selectivity, it would also be desirable to have access to oligomeric or polymeric oxazolidinone compounds with a reduced discoloration.

SUMMARY

The present invention has the object of providing such a method for the production of oxazolidinone compounds.

According to the present invention this object is achieved by a method for the production of oxazolidinone compounds, comprising the step of reacting an isocyanate compound with an epoxide compound in the presence of a Lewis acid catalyst, wherein the reaction is conducted in the absence of bases with a base strength $pK_b$ of ≤5, the reaction is conducted at a temperature of ≥150° C. and the isocyanate compound is added to the epoxide compound in a continuous or step-wise manner with two or more individual addition steps in the step-wise addition, wherein in each individual addition step the amount of isocyanate compound added is ≤50 weight-% of the total amount of isocyanate compound to be added.

DETAILED DESCRIPTION

Figure 1:
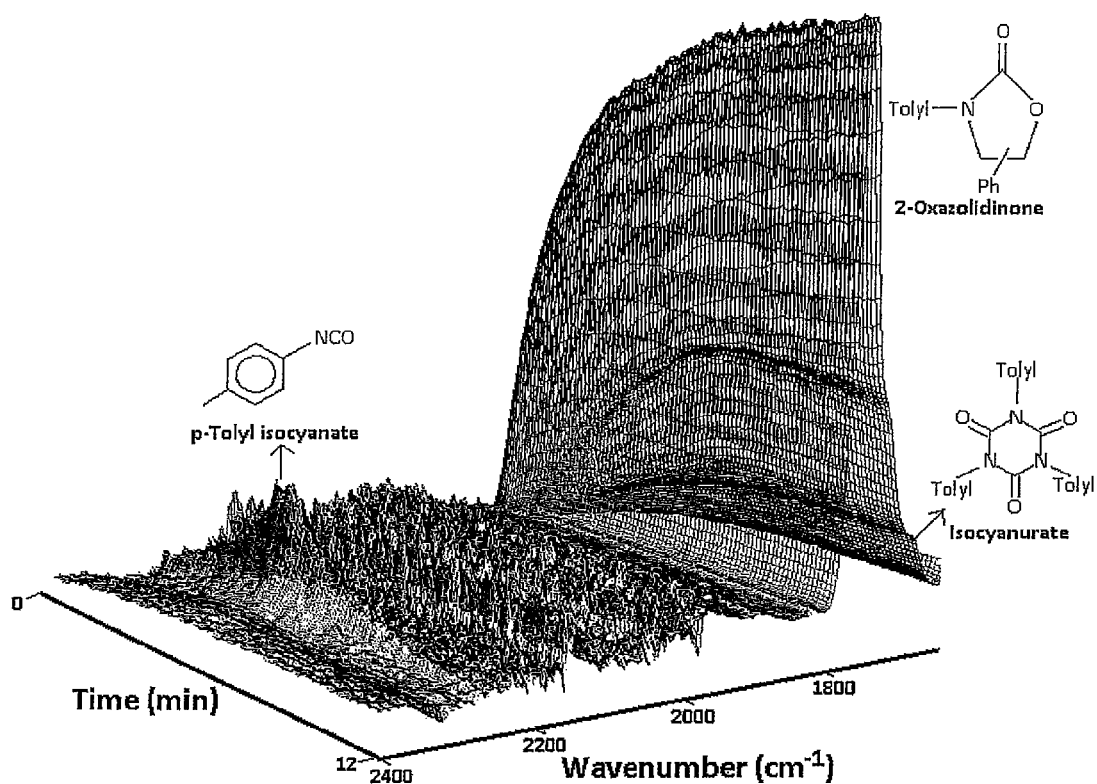
FIG. 1 is a representative time vs. concentration diagram obtained from in-situ IR, analysis of the reaction between p-tolyl isocyanate and R-(+)-styrene oxide of Example 7.

Surprisingly, it has been found that the reaction conditions according to the invention, namely the rather slow addition of the isocyanate compound, the comparatively high reaction temperatures and the use of Lewis-acidic catalysts, lead to the desired (linear) oxazolidinone compounds. Side reactions such as isocyanate trimerization can be suppressed and less discoloured oligomers or polymers can be obtained. Surprisingly, a shorter reaction time was required for full conversion of the isocyanate, when the isocyanate was added in the semi-batch mode compared to addition of the isocyanate in the batch mode.

As used herein, the term "oxazolidinone compounds" is meant to denote monooxazolidinone compounds obtainable by the reaction of a monoisocyanate with a monoepoxide. Furthermore, this term is meant to denote oligooxazolidinone compounds and polyoxazolidinone compounds obtainable by the reaction of a polyisocyanate with a monoepoxide, monoisocyanate with a polyepoxide or a polyisocyanate with a polyepoxide. Particularly preferred oligo- and polyoxazolidinone compounds are linear oligo- and polyoxazolidinone compounds.

As used herein, the term "isocyanate compound" is meant to denote monoisocyanate compounds, polyisocyanate compounds (having two or more NCO groups), NCO-terminated biurets, isocyanurates, uretdiones, carbamates and NCO-terminated prepolymers.

As used herein, the term "epoxide compound" is meant to denote monoepoxide compounds and polyepoxide compounds (having two or more epoxy groups).

As used herein, the term "Lewis acid" follows the definition given by IUPAC as a molecular entity (and the corresponding chemical species) that is an electron-pair acceptor and therefore able to react with a Lewis base to form a Lewis adduct, by sharing the electron pair furnished by the Lewis base. Hence, the Lewis acid catalyst may be a metal ion or a metal ion complex within this definition. The corresponding Lewis base that accompanies the Lewis acid catalyst is preferably of low nucleophilicity. Examples include bromide, iodide, tetraphenylborate, hexafluorophosphate, triflate (trifluoromethanesulfonate) and tosylate (p-tolylsulfonate). Particularly preferred nucleophiles are characterised by a low nucleophilicity with a value on the $CH_3I$ scale (J. Am. Chem. Soc. 99:24 (1977) 7968) of $\geq 2.0$, more preferred of $\geq 4.0$.

One feature of the method according to the invention is that the reaction is conducted in the absence of bases with a base strength $pK_b$ of $\leq 5$. Preferably this $pK_b$ value is $\leq 2$, more preferred $\leq 0$, even more preferred $\leq -1.5$. The base strength can be determined from the dissociation constant $pK_a$ of the corresponding acid in aqueous solution at 25° C. In the case of polybasic compounds, the base strength of the first dissociation step is used. To put the $pK_b$ value into perspective, $NH_3$ has a $pK_b$ value of 4.79 and the $OH^-$ ion has a $pK_b$ value of −1.74. The $pK_b$ value of potassium tert.-butoxide is −3.

Particular bases to be excluded are alkoxides such as butoxides. Besides the undesired side reactions by the strong bases themselves, the use of solvents such as alcohols for the alkoxides can lead to chain termination by the formation of terminal carbamate groups (with NCO groups) or the formation or terminal ether groups (with epoxy groups).

It has also been found in the research leading to the current invention that the selectivity for the formation of the desired oxazolidinone increases at elevated temperatures. Hence, the reaction is performed at a temperature of $\geq 150°$ C., preferably $\geq 165°$ C. and more preferred $\geq 185°$ C.

Another feature of the method according to the invention is that the isocyanate compound is added to the epoxide compound in a continuous or step-wise manner with two or more individual addition steps in the step-wise addition. This is to be understood in such a way that during the course of the reaction the isocyanate compound is added to the reaction mixture containing the epoxide compound continuously or in the aforementioned step-wise manner Included is also the case that the isocyanate compound is added via a syringe pump, dripping funnel or other continuous or semi-continuous devices where the isocyanate is brought into the reaction mixture. Although some after-reaction time may be given to the reaction system, the reaction should be essentially complete shortly after the end of the addition of the isocyanate compound.

By way of process criteria, one could establish a condition that 30 minutes, preferably 20 minutes and more preferred 10 minutes after the end of the isocyanate addition no more change in the NCO group content of the reaction mixture takes place (within the boundaries of experimental uncertainty). This may be observed, for example, by in-situ IR spectroscopy or analysis of samples of the reaction mixture concerning their NCO content, for example, by titration according to DIN ISO 10283.

In one embodiment of the method according to the invention, the isocyanate compound is added continuously to the reaction mixture. "Continuously" in the meaning of the invention means that the isocyanate compound is added to the reaction mixture over a defined period of time, while at the same time any isocyanate compound present in the reaction mixture is converted to the oxazolidinone compound. Preferably, the rate of isocyanate addition is smaller than or equal to the maximum rate, with which the isocyanate compound can be converted under these reaction conditions to the oxazolidinone compound in order to avoid accumulation of NCO groups in the reaction mixture. The actual concentration of NCO groups in the reaction mixture may be observed, for example, by in-situ IR spectroscopy. If the NCO group concentration is observed to increase above a set value, the rate of isocyanate addition is reduced. Preferably, the isocyanate compound is added with such an addition rate to the reaction mixture that the concentration of the isocyanate compound in the reaction mixture is $\leq 20$ weight-%, preferably $\leq 5$ weight-% and more preferred $\leq 1$ weight-%.

In another embodiment of the method according to the invention, in each individual addition step the amount of isocyanate compound added is $\leq 50$ weight-% of the total amount of isocyanate compound to be added. The aim is to keep the concentration of NCO groups in the reaction mixture low. Preferably, the amount of isocyanate compound added per individual addition step is $\leq 40$ weight-% of, more preferred $\leq 20$ weight-% of the total amount of isocyanate compound to be added.

It is furthermore preferred that the concentration of the isocyanate compound in the reaction mixture formed by the epoxide compound, the catalyst and the isocyanate (excluding any solvent, if present) is $\leq 20$ weight-%, preferably $\leq 5$ weight-% at any given point in time during the reaction.

In another embodiment of the method according to the invention, the isocyanate is formed in-situ in the reactor from an adequately chosen precursor. One suitable precursor is the carbamate of the isocyanate to be employed, whereby the alcohol, which is released during the reaction, is preferentially removed from the reaction mixture, e.g., by evaporation. The evaporation of the alcohol can be effected, e.g., by applying vacuum or by passing a stream of an inert gas, such as nitrogen or argon through the reaction mixture. Preferred carbamates are carbamates formed by reaction of low boiling alcohols, such as methanol, ethanol, 2,2,2-trifluoroethanol, propanol, butanol with the isocyanates according to the invention.

Polyoxazolidinones obtained by the method according to the invention are particularly suited as polymer building blocks in polyurethane chemistry. For example, epoxy-terminated oligomeric polyoxazolidinones (oligooxazolidinones) may be reacted with their NCO-terminated counterparts to form high molecular weight polyoxazolidinones, which are useful as transparent, high temperature-stable materials.

The present invention will now be further described in connection with specific embodiments and other aspects. They may be combined freely unless the context clearly indicates otherwise.

In one embodiment of the method according to the invention, the reaction is conducted at a temperature of ≥150° C. to ≤350° C. A preferred temperature range is ≥165° C. to ≤300° C., more preferred ≥180° C. to ≤250° C.

In another embodiment of the method according to the invention, in each individual addition step the amount of isocyanate compound added is ≥0.1 weight-% to ≤50 weight-% of the total amount of isocyanate compound to be added. Preferably, this amount is ≥1 weight-% to ≤40 weight-%, more preferred ≥5 weight-% to ≤20 weight-%.

In another embodiment of the method according to the invention, the reaction is conducted in the absence of a solvent. This avoids side reactions such as chain termination reactions by solvent molecules. Preferably, the reaction mixture only contains the epoxy compound(s), the isocyanate compound(s) and the catalyst(s), the latter together with their counter-ions as well as the oxazolidinone compound.

In another embodiment of the method according to the invention, the isocyanate compound is an isocyanate compound with two or more NCO groups per molecule and/or the epoxide compound is an epoxide compound with two or more epoxy groups per molecule.

Preferably the isocyanate compound is selected from the group comprising tetramethylene diisocyanate, hexamethylene diisocyanate (HDI), 2-methylpentamethylene diisocyanate, 2,2,4-trimethyl-hexamethylene diisocyanate (THDI), dodecanemethylene diisocyanate, 1,4-diisocyanatocyclohexane, 3-isocyanatomethyl-3,3,5-trimethylcyclohexyl isocyanate (isophorone diisocyanate, IPDI), diisocyanatodicyclohexylmethane ($H_{12}$-MDI), diphenylmethane diisocyanate (MDI), 4,4'-diisocyanato-3,3'-dimethyldicyclohexylmethane, 4,4'-diisocyanato-2,2-dicyclohexylpropane, poly(hexamethylene diisocyanate), octamethylene diisocyanate, tolylene-α,4-diisocyanate, poly(propylene glycol) tolylene-2,4-diisocyanate terminated, poly*ethylene adipate) tolylene-2,4-diisocyanate terminated, 2,4,6-trimethyl-1,3-phenylene diisocyanate, 4-chloro-6-methyl-1,3-phenylene diisocyanate, poly[1,4-phenylene diisocyanate-co-poly(1,4-butanediol)]diisocyanate, poly(tetrafluoroethylene oxide-co-difluoromethylene oxide) α,ω-diisocyanate, 1,4-diisocanatobutane, 1,8-diisocyanatooctane, 1,3-bis(1-isocyanato-1-methylethyl)benzene, 3,3'-dimethyl-4,4'-biphenylene diisocyanate, naphthalene-1,5-diisocyanate, 1,3-phenylene diisocyanate, 1,4-diisocyanatobenzene, 2,4- or 2,5- or 2,6-diisocyanatotoluene (TDI) or mixtures of these isomers, 4,4'-, 2,4- or 2,2'-diisocyanatodiphenylmethane or mixtures of these isomers, 4,4-, 2,4'- or 2,2'-diisocyanato-2,2-diphenylpropane-p-xylene diisocyanate and α,α,α',α'-tetramethyl-m- or -p-xylene diisocyanate (TMXDI), mixtures thereof or biurets, isocyanurates, carbamates or uretdiones of the aforementioned isocyanates.

Regarding the epoxide compound, it is also preferred that the epoxide compound is selected from the group comprising resorcinol diglycidyl ether, neopentyl glycol diglycidyl ether, 1,6-hexanediol diglycidyl ether, hydrogenated bisphenol A diglycidyl ether, bisphenol A diglycidyl ether, glycerol polyglycidyl ether, glycerol polyglycidyl ether, trimethylolpropane polyglycidyl ether, pentaerythritol polyglycidyl ether, diglycerol polyglycidyl ether, polyglycerol polyglycidyl ether, sorbitol polyglycidyl ether, diglycidyl terephthalate, diglycidyl o-phthalate, N-glycidyl phthalimide, ethylene glycol diglycidyl ether, polyethylene glycol diglycidyl ether, diethylene glycol diglycidyl ether, propylene glycol diglycidyl ether, dipropylene glycol diglycidyl ether, polypropylene glycol diglycidyl ether, polybutadiene diglycidyl ether.

In another embodiment of the method according to the invention, the Lewis acid catalyst is present in an amount of ≥0.0001 mol-% to ≤0.4 mol-%, based on the initial amount of epoxide compound. Preferably, the Lewis acid catalyst is present in an amount of ≥0.001 mol-% to ≤0.2 mol-%, more preferred ≥0.01 mol-% to ≤0.1 mol-%.

In another embodiment of the method according to the invention, the Lewis acid catalyst is a metal ion or a metal ion complex selected from the group comprising Li(I), Rb(I), Cs(I), Ag(I), Au(I),
Mg(II), Ca(II), Sr(II), Ba(II), Dy(II), Yb(II), Cu(II), Zn(II), V(II), Mo(II), Mn(II), Fe(II), Co(II) Ni(II), Pd(II), Pt(II), Ge(II), Sn(II),
Sc(III), Y(III), La(III), Ce(III), Pr(III), Nd(III), Sm(III), Eu(III), Gd(III), Tb(III), Dy(III), Ho(III), Er(III), Tm(III), Yb(III), Lu(III), Hf(III), Nb(III), Ta(III), Cr(III), Ru(III), Os(III), Rh(III), Ir(III), Al(III), Ga(III), In(III), Tl(III), Ge(III),
Ce(IV), Ti(IV), Zr(IV), Hf(IV), Nb(IV), Mo(IV), W(IV), Ir(IV), Pt(IV), Sn(IV), Pb(IV),
Nb(V), Ta(V), P(V), Sb(V), Bi(V),
Mo(VI), W(VI).

In the metal ion complex, an appropriately chosen ligand, such as phosphine, phosphite, arsenite, alkyl, acetylacetonate may be coordinated to the vacant coordination sites at the metal, whereby at least one coordination site remains available for binding of a Lewis base. The coordination site for binding of a Lewis base may also be created in the reaction mixture, e.g., by dissociation of a weakly coordinating ligand.

Preferred counter-anions are anions, which are weakly coordinating to the metal ion or metal ion complex. Examples for preferred anions are selected from the group comprising bromide, iodide, tetrafluoroborate, $[BR_4]^-$, $[AlR_4]^-$, $[GaR_4]^-$, $[InR_4]^-$, wherein R represents hydrogen, a linear or branched, optionally heteroatom-including C1- to C22-alkyl rest, a linear or branched, mono- or polysubstituted, optionally heteroatom-including C1- to C22-alkenyl rest, a mono- or polysubstituted, optionally heteroatom-including C6- to C18-aryl rest, member(s) of a saturated or unsaturated, optionally heteroatom-including 4- to 7-membered ring or polycyclic system, and each R can be different, $ROSO_3^-$ and $RSO_3^-$, whereby R has the above mentioned meaning, and $RSO_3^-$ is for example tosylate (p-tolylsulfonate) or triflate (trifluoromethanesulfonate).

In another embodiment of the method according to the invention the Lewis acid catalyst is selected from the group comprising LiBr, $SmI_3$, stibonium salts, phosphonium salts.

Examples of stibonium salts include $SbR^1_4Br$, $SbR^1_3R^2Br$, $SbR^1_2R^2_2Br$, $SbR^1R^2_3Br$; examples of phosphonium salts include $PR^1_4Br$, $PR^1_3R^2Br$, $PR^1_2R^2_2Br$, $PR^1R^2_3Br$. $R^1$ may be a mono, bi or tri-functional aromatic ring, $R^2$ may be an aliphatic chain (linear or branched) or functionalized alicyclic fragment. Preferred stibonium salts are $SbPh_n(n-Bu)_{4-n}Br$, $SbPh_n(Cy)_{4-n}Br$ (Cy=cyclohexyl), with n=0, 1, 2, 3, 4. Preferred phosphonium salts are $PPh_n(n-Bu)_{4-n}Br$, $PPh_n(Cy)_{4-n}Br$ (Cy=cycloheyl), with n=0, 1, 2, 3, 4.

In another embodiment of the present invention, the Lewis acidic catalyst is combined with a bromide, iodide, or a $RSO_4^-$ and/or $RSO_3^-$ salt as co-catalyst, R representing an organic group.

In another embodiment of the method according to the invention, the molar ratio of the oxazolidinone product to isocyanurate by-product o/i is ≥75/25, preferably ≥85/15 and most preferably ≥99/1. This ratio can be determined, for example, using NMR spectroscopy.

Another aspect of the present invention is an oxazolidinone compound, obtainable by a method according to the invention, with a colour as determined according to ASTM D1209-05 (2011) of ≤200 and a molar ratio of the oxazolidinone compound to isocyanurate by-product o/i of ≥85/15.

The present invention is further directed towards an oligomeric or polymeric oxazolidinone compound, obtainable by a method according to the invention using an isocyanate compound with two or more NCO groups per molecule and an epoxide compound with two or more epoxy groups per molecule, comprising at least one unit derived from the isocyanate compound and at least two units derived from the epoxide compound, with a colour as determined according to ASTM D1209-05 (2011) of ≤200.

The chain length for the prepolymers can be controlled by changing the ratio between the polyepoxide and the polyisocyanate compound. An epoxide terminated prepolymer is obtained, when the polyepoxide is employed in excess. An isocyanate terminated prepolymer is obtained, when the polyisocyanate is employed in excess. Linear polymer chains with high molecular weight are obtained, when equimolar amounts of diepoxide and diisocyanate are reacted with each other. The precise content of epoxide and isocyanate groups in the diepoxide and diisocyanate, respectively, are preferentially determined before the polymerisation reaction, e.g., by measuring the epoxide number according to German standard norm DIN EN 1877-1 and the isocyanate number according to German standard norm DIN EN ISO 11909.

Number average molecular weights Mn may be, for example, be in a range of ≥2000 g/mol to ≤5000 g/mol as calculated by end-group analysis based on $^1$H-NMR spectroscopy which is described in detail below.

An alternative method to control the molecular weight of the products constitutes in adding a small amount of a monoepoxide or monoisocyanate to the mixture of polyepoxide and the polyisocyanate compound.

Preferably this oligomeric or polymeric oxazolidinone compound comprises at least one terminal epoxide and/or isocyanate group.

It is also possible that this oligomeric or polymeric oxazolidinone compound comprises at least one terminal group which is non-reactive towards epoxide and/or isocyanate groups. Examples include alkoxy groups or trialkylsiloxane groups.

EXAMPLES

The present invention will be further described with reference to the following examples without wishing to be limited by them.

R-(+)-Styrene oxide and para-tolyl isocyanate were distilled in a partial vacuum (200 mbar, 80° C.) prior to use.

The 300 ml pressurized reactor used in the Examples had a height (internal) of 10.16 cm and an internal diameter of 6.35 cm. The reactor was fitted with an electric heating jacket (510 watt maximum heating capacity). The counter cooling consisted of a U-shaped dip tube of external diameter 6 mm which projected into the reactor to within 5 mm of the bottom and through which cooling water at approx. 10° C. was passed. The water stream was switched on and off by means of a solenoid valve. The reactor was also fitted with an inlet tube and a temperature probe of diameter 1.6 mm, both of which projected into the reactor to within 3 mm of the bottom. The impeller agitator used in the Examples was a pitched-blade turbine in which a total of two agitator stages, each with four agitator blades (45°) of diameter 35 mm and height 10 mm, were attached to the agitator shaft at a distance of 7 mm.

The in-situ IR analysis of the reaction mixture was carried out using a Matrix-MF spectrometer (Bruker Optic GmbH) equipped with a silicon MIR fibre optical probe (Bruker Optic GmbH). The silicon at the tip of the IR probe was immersed into the reaction mixture and the IR spectrum was recorded using the OPUS 6.5 software. Before starting the experiment, a background spectrum was taken against ambient air, whereby a scan velocity of 40 kHz was used and the background spectrum was the average of 100 scans Infrared spectra were recorded every 15 seconds, whereby a scan velocity of 40 kHz was used and each spectrum was the average of 20 scans. Complete conversion was indicated by the disappearance of the characteristic isocyanate band at 2250-2260 $cm^{-1}$. The formation of oxazolidinone moieties was indicated by the appearance of the characteristic oxazolidinone band at 1743 $cm^{-1}$. The formation of isocyanurate moieties was indicated by the appearance of the characteristic isocyanurate band at 1690 $cm^{-1}$.

The IR spectra were deconvoluted mathematically by using PEAXACT 3.07 software. Initially, recorded in-situ IR spectra of pure components using OPUS software were fed into the PEAXACT software and a mixture component model spectrum was built. The in-situ time resolved IR spectra (recorded during the catalytic reaction) were then fed into the PEAXACT software and the component concentrations were calculated in mole % using Hard Model Factor Analysis (HMFA) calculation method. The ratio of oxazolidinone to isocyanurate o/i was calculated at the end point of the reaction based on the molar yield of each product. Thus, the ratio o/i refers, e.g, to the ratio of the oxazolidinone 3-(4-methylphenyl)-5-phenyl-2-oxazolidinone to the isocyanurate 1,3,5-tris-(4-methylphenyl)-1,3,5-triazine-2,4,6(1H,3H,5H)-trione at the end point of the reaction based on the molar yield of the two products.

The solid state IR analysis was performed on a Bruker ALPHA-P IR spectrometer equipped with a diamond probe head. Before obtaining the IR spectrum of the sample, a background spectrum was recorded against ambient air. After that, a small sample (several milligrams) of the prepolymer sample was applied to diamond probe and the IR spectrum recorded on a computer connected with the spectrometer using OPUS 6.5 software averaging over 32 spectra obtained in the range of 4000 to 400 $cm^{-1}$ with a resolution of 4 $cm^{-1}$.

The products were analysed with HPLC analysis and NMR spectroscopy as well as for their colour as detailed below.

The HPLC analysis was carried out on an Agilent Technologies 1200 Series instrument Equipped with an UV detector. A water-methanol solvent system was used for separation of the components of the reaction mixture. Initially an isocratic condition was maintained for 20 min with water-to-methanol ratio of 60:40 and then the methanol content in the flow was increased gradually to 100% within another 20 min of run time. Throughout the run a flow rate of 1.0 mL/min was maintained. For separation of the components a Waters SymmetryShield $RP_{18}$ column (particle size 5 μm, pore size 100 Å) was used, whereby the temperature was maintained at 40° C. throughout the measurement using a column oven. For HPLC analysis of the reaction mixture, the sample (10 mg) and mesitylene (5 μl) were dissolved in methanol (1 ml) in a 1.5 mL sample vial equipped with rubber septum cap.

In the cycloaddition reaction, the two different regioisomers of the 3,5-oxazolidin-2-one (5-OXA), as shown in formula Ia, and the 3,4-oxazolidin-2-one (4-OXA), as shown in formula Ib, are formed. The ratio of the two regioisomers is determined during opening of the epoxide ring in the presence of the Lewis acid catalyst.

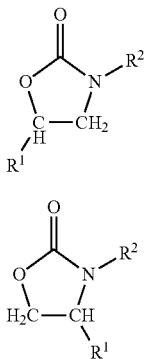

Both these two regioisomers can be identified by looking into the $^1$H NMR spectral pattern for the characteristic proton signals associated with the methine and methylene protons of the heterocyclic oxazolidinone ring fragments and the methylene and methine protons of the epoxide end group.

In the terminology used in the examples, the term "semi-batch addition" means that the isocyanate compound is added with a constant rate (continuously) over the specified period of time. The term "step-wise addition" means that the isocyanate compound is added in individual steps comprising a part of the total amount of the isocyanate compound.

The average chain length for the synthesized epoxy terminated prepolymers was controlled by changing the ratio between the diepoxide and diisocyanate used in the particular reaction. Formula (II) gives a general mathematical formula to calculate the average chain length n in the oligomeric product based on the molar ratios of diepoxide and diisocyanate employed.

$$n=1/[\{(\text{amount of epoxide in mol})/(\text{amount of isocyanate in mol})\}-1] \quad \text{(II)}$$

The molecular weight and the number of repeating units in the synthesized polyoxazolidinone prepolymer were calculated by end-group analysis based on $^1$H-NMR spectroscopy. A sample of the prepolymer was dissolved in deuterated chloroform and measured on a Bruker spectrometer (AV400, 400 MHz). All prepolymers were epoxide terminated as was confirmed by the presence of the characteristic epoxide proton signals in the $^1$H NMR analysis of the reaction mixture.

System 1: Reaction of 4,4'-Isopropylidenediphenol diglycidyl ether (BADGE) with 4,4'-Methylenebis (cyclohexyl isocyanat) (DESMODUR-W)

A representative example of the polyoxazolidinone structure is shown in the figure below. The formula weight (FW) of the end-groups and the repeating unit is given, based on which the average molecular weight and chain length was estimated.

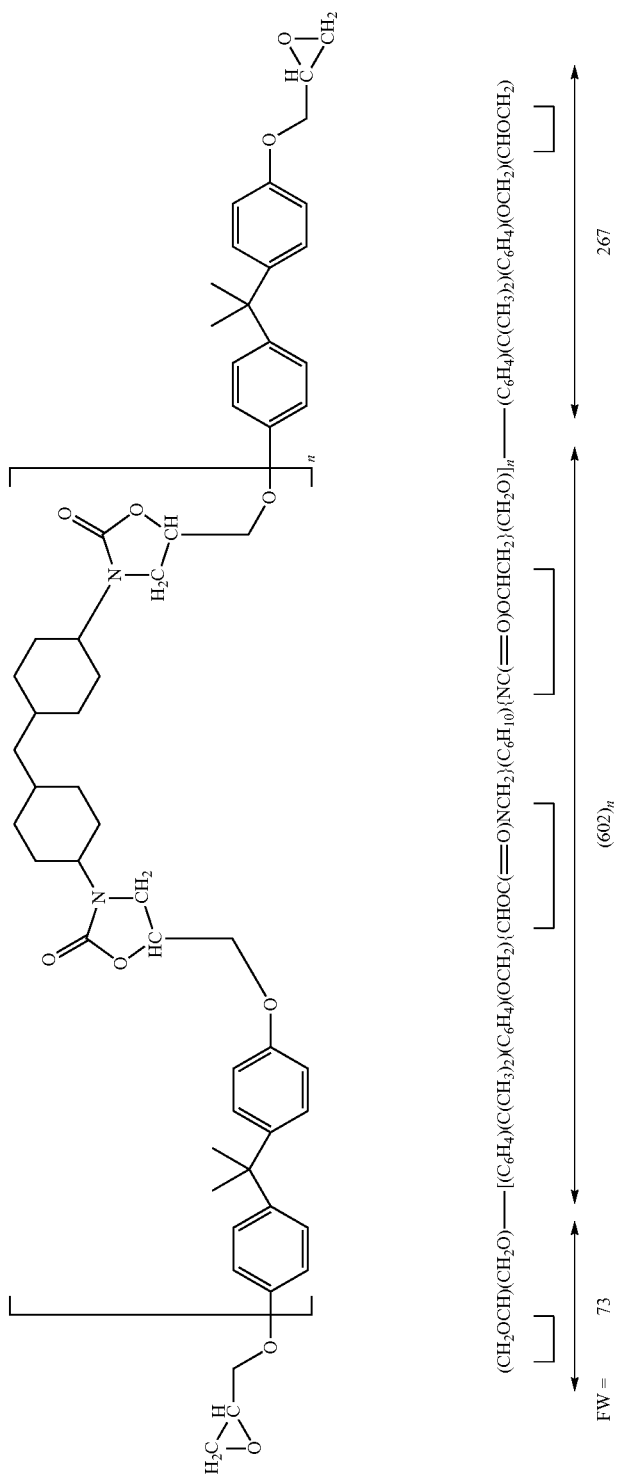

Figure: Representative example of the polyoxazolidinone structure of System 1.

The relevant resonances in the $^1$H-NMR spectrum (relative to TMS=0 ppm), which were used for integration are as follows:

I1-1: 2.7 ppm: methylene group of epoxide end group; resonance area corresponds to one H atom I1-2: 2.8 ppm: methylene group of epoxide end group; resonance area corresponds to one H atom I1-3: 3.3 ppm: methine group of epoxide end group; resonance area corresponds to one H atom I1-4: 3.0 ppm: methylene groups of the oxazolidinone moieties; resonance area corresponds to one H atom I1-5: 4.2 ppm: methylene groups of the oxazolidinone moieties; resonance area corresponds to one H atom I1-6: 4.7 and 4.5 ppm: methine groups of the oxazolidinone moieties; resonance area corresponds to one H atom The average number of repetition units is calculated according to the following formula:

$$n = [\{(I1\text{-}4 + I1\text{-}5 + I1\text{-}6) - (I1\text{-}1 + I1\text{-}2 + I1\text{-}3)\} / \{2 \times (I1\text{-}4 + I1\text{-}5 + I1\text{-}6)\}] \quad (III)$$

System 2: Reaction of 4,4'-Isopropylidenediphenol diglycidyl ether (BADGE) with 3,5-bis(6-isocyanatohexyl)-1,3,5-oxadiazinane-2,4,6-trione (Baymicron-OXA)

A representative example of the polyoxazolidinone structure is shown in the figure below. The formula weight (FW) of the end-groups and the repeating unit is given, based on which the average molecular weight and chain length was estimated.

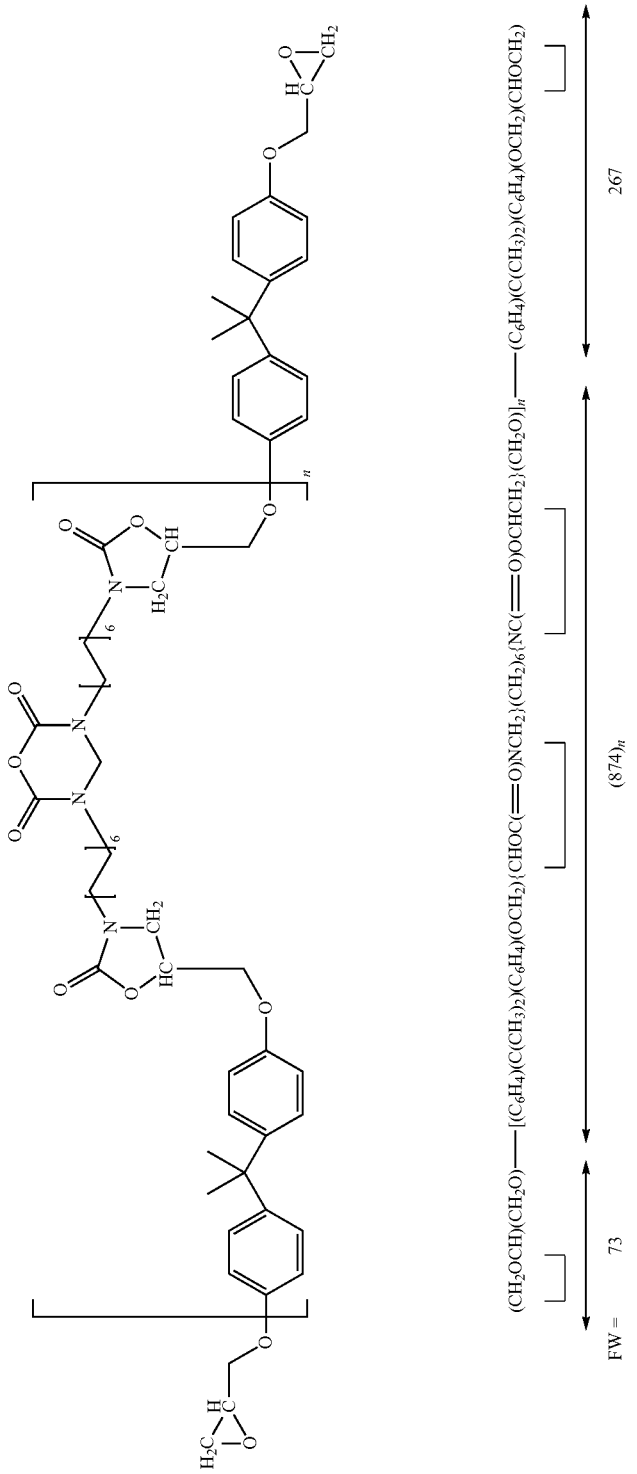

Figure: Representative example of the polyoxazolidinone structure of System 2.

The relevant resonances in the $^1$H-NMR spectrum (relative to TMS=0 ppm), which were used for integration are as follows:

I2-1: 2.4 ppm: methylene group of epoxide end group; resonance area corresponds to one H atom I2-2: 2.6 ppm: methylene group of epoxide end group; resonance area corresponds to one H atom I2-3: 3.0 ppm: methine group of epoxide end group; resonance area corresponds to one H atom I1-4: 3.0 ppm: methylene groups of the oxazolidinone moieties; resonance area corresponds to one H atom I1-5: 4.4 ppm: methylene groups of the oxazolidinone moieties; resonance area corresponds to one H atom I1-6: 5.1 and 4.6 ppm: methine groups of the oxazolidinone moieties; resonance area corresponds to one H atom The average number of repetition units is calculated according to the following formula:

$$n=[\{(I2\text{-}4+I2\text{-}5+I2\text{-}6)-(I2\text{-}1+I2\text{-}2+I2\text{-}3)\}/\{2\times(I2\text{-}4+I2\text{-}5+I2\text{-}6)\}] \quad (IV)$$

System 3: Reaction of 4,4'-Isopropylidenediphenol diglycidyl ether (BADGE) with bis(4-isocyanatophenyl)methane (MDI-44)

A representative example of the polyoxazolidinone structure is shown in the figure below. The formula weight (FW) of the end-groups and the repeating unit is given, based on which the average molecular weight and chain length was estimated.

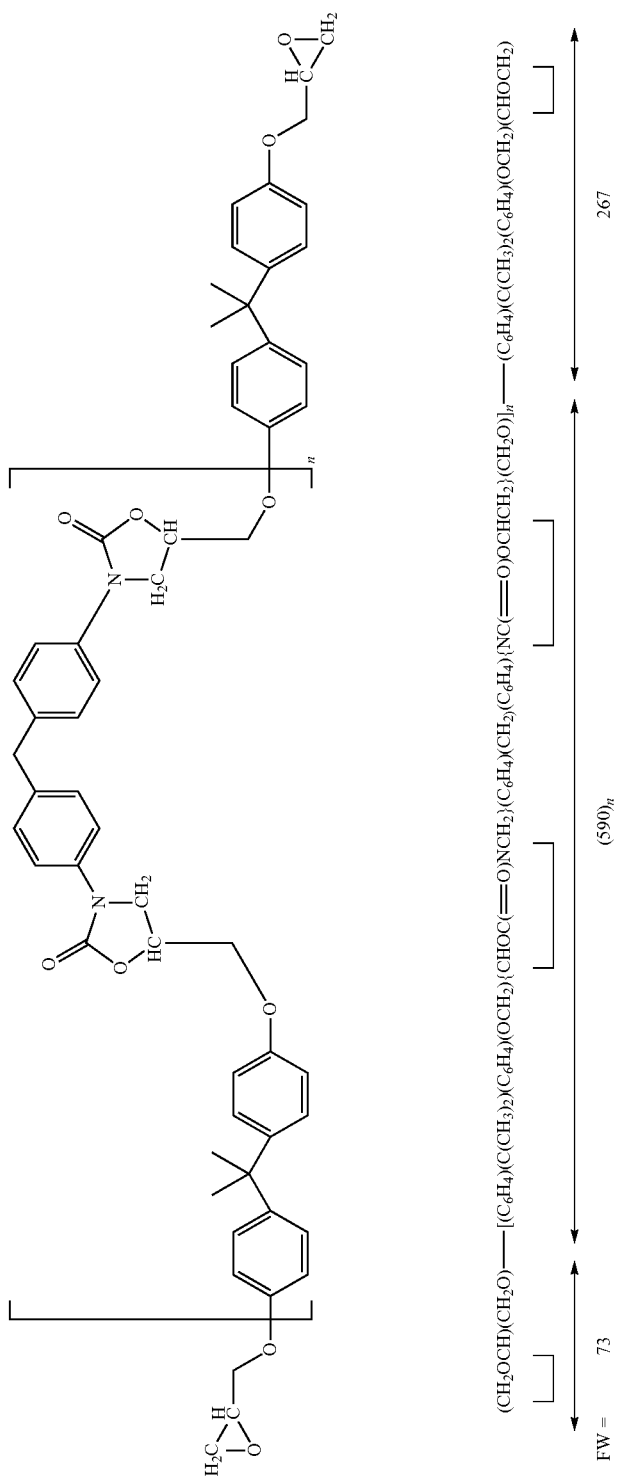

Figure: Representative example of the polyoxazolidinone structure of System 3.

The relevant resonances in the $^1$H-NMR spectrum (relative to TMS=0 ppm), which were used for integration are as follows:

I3-1: 2.4 ppm: methylene group of epoxide end group; resonance area corresponds to one H atom
I3-2: 2.6 ppm: methylene group of epoxide end group; resonance area corresponds to one H atom
I3-3: 3.0 ppm: methine group of epoxide end group; resonance area corresponds to one H atom
I1-4: 3.2 ppm: methylene groups of the oxazolidinone moiety; resonance area corresponds to one H atom
I1-5: 2.9 ppm: methylene groups of the oxazolidinone moiety; resonance area corresponds to one H atom
I1-6: 4.9 ppm: methine groups of the oxazolidinone moiety; resonance area corresponds to one H atom The average number of repetition units is calculated according to the following formula:

$$n=[\{(I3\text{-}4+I3\text{-}5+I3\text{-}6)-(I3\text{-}1+I3\text{-}2+I3\text{-}3)\}/\{2\times(I3\text{-}4+I3\text{-}5+I3\text{-}6)\}] \quad (V)$$

System 4: Reaction of 1,3-bis(oxiran-2-ylmethoxy) benzene (RDE) with 4,4'-Methylenebis(cyclohexyl isocyanate) (DESMODUR-W)

A representative example of the polyoxazolidinone structure is shown in the Figure below. The formula weight (FW) of the end-groups and the repeating unit is given, based on which the average molecular weight and chain length was estimated.

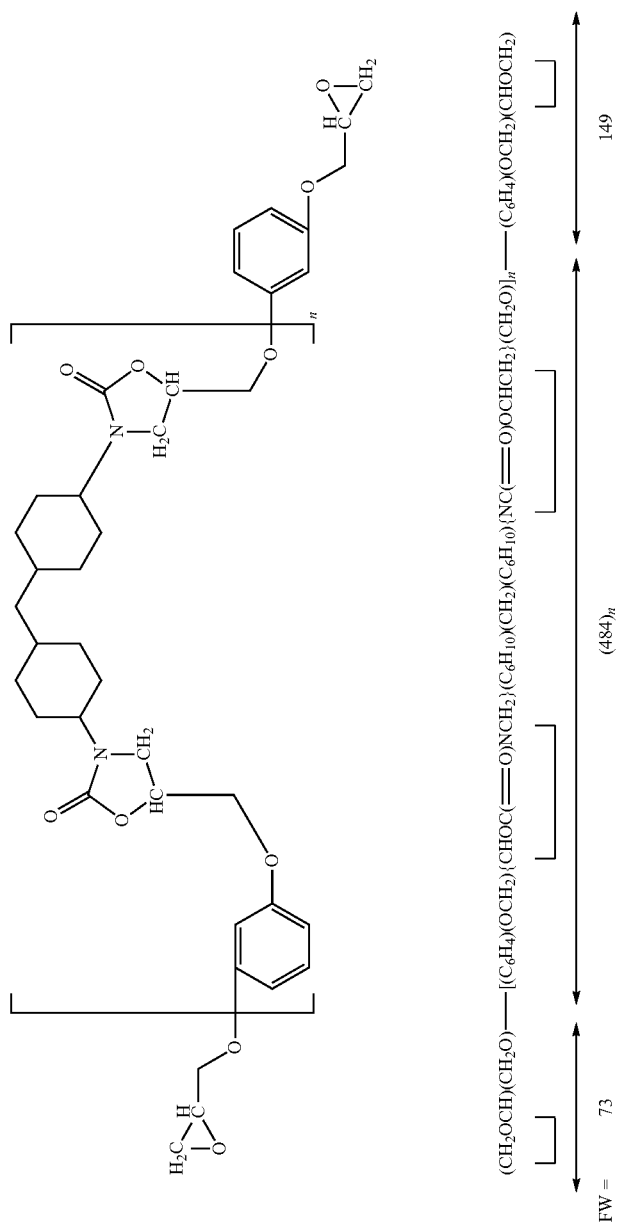

Figure: Representative example of the polyoxazolidinone structure of System 4.

The relevant resonances in the $^1$H-NMR spectrum (relative to TMS=0 ppm), which were used for integration are as follows:
I4-1: 2.4 ppm: methylene group of epoxide end group; resonance area corresponds to one H atom
I4-2: 2.6 ppm: methylene group of epoxide end group; resonance area corresponds to one H atom
I4-3: 3.0 ppm: methine group of epoxide end group; resonance area corresponds to one H atom
I1-4: 3.2 and 4.4 ppm: methylene groups of the oxazolidinone moieties; resonance area corresponds to one H atom
I1-5: 3.1 and 4.3 ppm: methylene groups of the oxazolidinone moieties; resonance area corresponds to one H atom
I1-6: 5.0 and 4.6 ppm: methine groups of the oxazolidinone moieties; resonance area corresponds to one H atom The average number of repetition units is calculated according to the following formula:

$$n=[\{(I4\text{-}4+I4\text{-}5+I4\text{-}6)-(I4\text{-}1+I4\text{-}2+I4\text{-}3)\}/\{2\times(I4\text{-}4+I4\text{-}5+I4\text{-}6)\}] \quad (VI)$$

The colour of the products was determined using a Nach Lange Lico 150 colorimeter. The instrument was calibrated for sensitivity with respect to standard samples. Before measuring the sample the background was taken against an empty cuvette. After that the cuvette containing the sample was placed inside the colorimeter and the output colour value was read out from the display.

The viscosity and the molecular weight were determined on an Anton Paar Physica MCR 501 rheometer equipped with a D-CP/PP 7 (25 mm Plate-Plate) measuring system. The shear rate was increased from 0.01 to 1000 l/s in 60 increments, whereby a constant shear rate was applied for 10 seconds each. The viscosity was calculated as the average of the 60 measurements. Further, the two shear force parameters, the storage modulus (G') and the loss modulus (G") were measured. For calculation of the molecular weight distribution, polystyrene was used as internal standard. The data measured were processed using Rheoplus version 3.40 software.

Example 1

Reaction of R-(+)-Styrene Oxide with Para-Tolyl Isocyanate Using SmI$_3$ as Catalyst with Semi-Batch Addition of the Isocyanate Under a continuous flow of Argon (2.0 L/h), a glass flask (20 mL) was charged with SmI$_3$ (46.57 mg, 0.0877 mmol) and R-(+)-styrene oxide (1.054 g, 8.77 mmol). The mixture was stirred (800 rpm) at room temperature for 10 min using a magnetic stirrer bar of 0.5 cm length. The flask was then placed into a hot oil bath set to 160° C. The IR probe was immersed into the reaction mixture and the IR spectrometer started. Para-tolyl isocyanate (1.168 g, 8.77 mmol) was added slowly at 0.2 mL/min. After all para-tolyl isocyanate had been added, stirring was continued until completion of the reaction was confirmed by the absence of the isocyanate band in the IR spectrum. The heating of the oil bath was switched off and the reaction mixture cooled to room temperature within of 30 min. The chemical composition of the reaction mixture was analysed.

During addition of the para-tolyl isocyanate over 5.5 min, the isocyanate band was not observed.

The ratio o/i determined from the IR spectrum after 5.5 min was 99.88/0.12.

Colour of the reaction mixture after cooling: 220 Apha
HPLC analysis confirmed full conversion of R-(+)-styrene oxide and para-tolyl isocyanate.

Example 2

Reaction of R-(+)-Styrene Oxide with Para-Tolyl Isocyanate Using SmI$_3$ as Catalyst with Step-Wise Addition of Para-Tolyl Isocyanate Under a continuous flow of Argon (2.0 L/h), a glass flask (20 mL) was charged with SmI$_3$ (46.57 mg, 0.0877 mmol) and R-(+)-styrene oxide (1.054 g, 8.77 mmol). The mixture was stirred (800 rpm) at room temperature for 10 min using a magnetic stirrer bar of 0.5 cm length. The flask was then placed into a hot oil bath set to 160° C. The IR probe was immersed into the reaction mixture and the IR spectrometer started. A first pulse of para-tolyl isocyanate (0.388 g, 2.92 mmol) was added quickly (within of 2 s) and the reaction mixture was stirred until completion of the reaction was indicated by disappearance of the isocyanate band. A second pulse of para-tolyl isocyanate (0.388 g, 2.91 mmol) was added quickly (within of 2 s) and the reaction mixture was stirred until completion of the reaction was indicated by disappearance of the isocyanate band. A third pulse of para-tolyl isocyanate (0.388 g, 2.92 mmol) was added quickly (within of 2 s) and the reaction mixture was stirred until completion of the reaction was indicated by disappearance of the isocyanate band. The heating of the oil bath was switched off and the reaction mixture cooled to room temperature within of 30 min. The chemical composition of the reaction mixture was analysed.

Time to full conversion of the isocyanate after the third pulse: 49 min

The ratio o/i determined from the IR spectrum taken 49 min after the third pulse was 75.40/24.60.

Colour of the reaction mixture after cooling: 255 Apha
HPLC analysis confirmed full conversion of R-(+)-styrene oxide and para-tolyl isocyanate.

Comparison Example 3

Reaction of R-(+)-Styrene Oxide with Para-Tolyl Isocyanate Using SmI$_3$ as Catalyst in Batch Mode Under a continuous flow of Argon (2.0 L/h), a glass flask (20 mL) was charged with SmI$_3$ (46.57 mg, 0.0877 mmol) and R-(+)-styrene oxide (1.054 g, 8.77 mmol). The mixture was stirred (800 rpm) at room temperature for 10 min using a magnetic stirrer bar of 0.5 cm length. The flask was then placed into a hot oil bath set to 160° C. The IR probe was immersed into the reaction mixture and the IR spectrometer started. Para-tolyl isocyanate (1.168 g, 8.77 mmol) was added quickly (within of 2 s). The reaction mixture was stirred until completion of the reaction was indicated by disappearance of the isocyanate band. The heating of the oil bath was switched off and the reaction mixture cooled to room temperature within of 30 min. The chemical composition of the reaction mixture was analysed.

Time to full conversion of the isocyanate: 32 min
The ratio o/i determined from the IR spectrum after 32 min was 64.71/35.29.

Colour of the reaction mixture after cooling: 310 Apha
HPLC analysis confirmed full conversion of R-(+)-styrene oxide and para-tolyl isocyanate.

Comparison of Examples 1 to 3

A comparison of the time to full conversion of the isocyanate and the selectivity to the oxazolidinone as well as the colour of the product is given in the following Table:

| Example | Catalyst | Operation mode | Isocyanate addition | Time to full conversion (min) | Ratio o/i | Colour/ Apha |
|---|---|---|---|---|---|---|
| 1 | SmI$_3$ | Semi-batch | Over 5.5 min | n.o. | 99.88/0.12 | 220 |
| 2 | SmI$_3$ | Step-wise | In 3 pulses | 49 | 75.40/24.60 | 255 |
| 3 (Cmp.) | SmI$_3$ | Batch | In 1 pulse | 32 | 64.71/35.29 | 310 |

Cmp.: Comparison example;
n.o. during addition of the isocyanate the isocyanate band was not observed In example 1, in which the isocyanate was added in the semi-batch mode, the isocyanate concentration remained below the detection limit of the in-situ IR spectroscopy, indicating that the isocyanate was immediately converted as it was added to the reaction mixture. A comparison of the example 1 with the comparison example 3 shows that the reaction time required for complete conversion of the isocyanate in the semi-batch mode (5.5 min) is much shorter compared to the time required for complete conversion of the isocyanate in the batch mode (32 min) A comparison of the example 1 with the comparison example 3 also shows that an improved selectivity to the oxazolidinone was obtained. The colour of the reaction product of example 1 is less intense compared to example 3.

A comparison of the example 2 with the comparison example 3 shows that an improved selectivity to the oxazolidinone is obtained when para-tolyl isocyanate is added in several pulses. The colour of the reaction product of example 2 is less intense compared to example 3.

Example 4

Reaction of R-(+)-Styrene Oxide with Para-Tolyl Isocyanate Using LiBr as Catalyst with Semi-Batch Addition of the Isocyanate Under a continuous flow of Argon (2.0 L/h), a glass flask (20 mL) was charged with LiBr (7.61 mg, 0.0877 mmol) and R-(+)-styrene oxide (1.054 g, 8.77 mmol). The mixture was stirred (800 rpm) at room temperature for 10 min using a magnetic stirrer bar of 0.5 cm length. The flask was then placed into a hot oil bath set to 160° C. The IR probe was immersed into the reaction mixture and the IR spectrometer started. Para-tolyl isocyanate (1.168 g, 8.77 mmol) was added slowly at 0.2 mL/min. After all para-tolyl isocyanate had been added, stirring was continued until completion of the reaction was confirmed by the absence of the isocyanate band in the IR spectrum. The heating of the oil bath was switched off and the reaction mixture cooled to room temperature within of 30 min. The chemical composition of the reaction mixture was analysed.

During addition of the para-tolyl isocyanate over 5.5 min, the isocyanate band was not observed.

The ratio o/i determined from the IR spectrum after 5.5 min was 99.88/0.02.

Colour of the reaction mixture after cooling: 332 Apha

HPLC analysis confirmed full conversion of R-(+)-styrene oxide and para-tolyl isocyanate.

Example 5

Reaction of R-(+)-Styrene Oxide with Para-Tolyl Isocyanate Using LiBr as Catalyst with Step-Wise Addition of Para-Tolyl Isocyanate Under a continuous flow of Argon (2.0 L/h), a glass flask (20 mL) was charged with LiBr (7.61 mg, 0.0877 mmol) and R-(+)-styrene oxide (1.054 g, 8.77 mmol). The mixture was stirred (800 rpm) at room temperature for 10 min using a magnetic stirrer bar of 0.5 cm length. The flask was then placed into a hot oil bath set to 160° C. The IR probe was immersed into the reaction mixture and the IR spectrometer started. A first pulse of para-tolyl isocyanate (0.388 g, 2.92 mmol) was added quickly (within of 2 s) and the reaction mixture was stirred until completion of the reaction was indicated by disappearance of the isocyanate band. A second pulse of para-tolyl isocyanate (0.388 g, 2.91 mmol) was added quickly (within of 2 s) and the reaction mixture was stirred until completion of the reaction was indicated by disappearance of the isocyanate band. A third pulse of para-tolyl isocyanate (0.388 g, 2.92 mmol) was added quickly (within of 2 s) and the reaction mixture was stirred until completion of the reaction was indicated by disappearance of the isocyanate band. The heating of the oil bath was switched off and the reaction mixture cooled to room temperature within of 30 min. The chemical composition of the reaction mixture was analysed.

Time to full conversion of the isocyanate after the third pulse: 28 min

The ratio o/i determined from the IR spectrum taken 28 min after the third pulse was 92.09/7.91.

Colour of the reaction mixture after cooling: 289 Apha

HPLC analysis confirmed full conversion of R-(+)-styrene oxide and para-tolyl isocyanate.

Comparison Example 6

Reaction of R-(+)-Styrene Oxide with Para-Tolyl Isocyanate Using LiBr as Catalyst in Batch Mode Under a continuous flow of Argon (2.0 L/h), a glass flask (20 mL) was charged with LiBr (7.61 mg, 0.0877 mmol) and R-(+)-styrene oxide (1.054 g, 8.77 mmol). The mixture was stirred (800 rpm) at room temperature for 10 min using a magnetic stirrer bar of 0.5 cm length. The flask was then placed into a hot oil bath set to 160° C. The IR probe was immersed into the reaction mixture and the IR spectrometer started. Para-tolyl isocyanate (1.168 g, 8.77 mmol) was added quickly (within of 2 s). The reaction mixture was stirred until completion of the reaction was indicated by disappearance of the isocyanate band. The heating of the oil bath was switched off and the reaction mixture cooled to room temperature within of 30 min. The chemical composition of the reaction mixture was analysed.

Time to full conversion of the isocyanate: 32 min

The ratio o/i determined from the IR spectrum after 32 min was 71.95/28.05.

Colour of the reaction mixture after cooling: 397 Apha

HPLC analysis confirmed full conversion of R-(+)-styrene oxide and para-tolyl isocyanate.

Comparison of Examples 4 to 6

A comparison of the time to full conversion of the isocyanate and the selectivity to the oxazolidinone as well as the colour of the product is given in the following Table:

| Example | Catalyst | Operation mode | Isocyanate addition | Time to full conversion (min) | Ratio o/i | Colour/ Apha |
|---|---|---|---|---|---|---|
| 4 | LiBr | Semi-batch | Over 5.5 min | n.o. | 99.88/0.02 | 332 |
| 5 | LiBr | Step-wise | In 3 pulses | 28 | 92.09/7.91 | 289 |
| 6 (Cmp.) | LiBr | Batch | In 1 pulse | 32 | 71.95/28.05 | 397 |

Cmp.: Comparison example
n.o. during addition of the isocyanate the isocyanate band was not observed In example 4, in which the isocyanate was added in the semi-batch mode, the isocyanate concentration remained below the detection limit of the in-situ IR spectroscopy, indicating that the isocyanate was immediately converted as it was added to the reaction mixture. A comparison of the example 4 with the comparison example 6 shows that the reaction time required for complete conversion of the isocyanate in the semi-batch mode (5.5 min) is much shorter compared to the time required for complete conversion of the isocyanate in the batch mode (32 min). A comparison of the example 1 with the comparison example 3 also shows that an improved selectivity to the oxazolidinone was obtained. The colour of the reaction product of example 4 is less intense compared to example 6.

A comparison of the example 5 with the comparison example 6 shows that an improved selectivity to the oxazolidinone is obtained when para-tolyl isocyanate is added in several pulses. The colour of the reaction product of example 5 is much less intense compared to example 6.

Example 7

Reaction of R-(+)-Styrene Oxide with Para-Tolyl Isocyanate Using $Ph_4SbBr$ as Catalyst with Semi-Batch Addition of the Isocyanate Under a continuous flow of Argon (2.0 L/h), a glass flask (20 mL) was charged with $Ph_4SbBr$ (44.73 mg, 0.0877 mmol) and R-(+)-styrene oxide (1.054 g, 8.77 mmol). The mixture was stirred (800 rpm) at room temperature for 10 min using a magnetic stirrer bar of 0.5 cm length. The flask was then placed into a hot oil bath set to 160° C. The IR probe was immersed into the reaction mixture and the IR spectrometer started. Para-tolyl isocyanate (1.168 g, 8.77 mmol) was added slowly at 0.2 mL/min. After all para-tolyl isocyanate had been added, stirring was continued until completion of the reaction was confirmed by the absence of the isocyanate band in the IR spectrum. The heating of the oil bath was switched off and the reaction mixture cooled to room temperature within of 30 min. The chemical composition of the reaction mixture was analysed.

During addition of the para-tolyl isocyanate over 5.5 min, the isocyanate band was observed with low intensity. Full conversion of the isocyanate was obtained 4.5 min after addition of the para-tolyl isocyanate had been completed. In total, 10 min were required for full conversion of the isocyanate.

The ratio o/i determined from the IR spectrum after 10 min was 99.38/0.62.

Colour of the reaction mixture after cooling: 85 Apha

HPLC analysis confirmed full conversion of R-(+)-styrene oxide and para-tolyl isocyanate.

FIG. 1 shows a representative time vs. concentration diagram obtained from in-situ IR analysis of the reaction between p-tolyl isocyanate and R-(+)-styrene oxide (Example 7). The p-tolyl isocyanate was added in the semi-batch mode. The important signals are marked with the respective structure of the molecules.

Example 8

Reaction of R-(+)-Styrene Oxide with Para-Tolyl Isocyanate Using $Ph_4SbBr$ as Catalyst with Step-Wise Addition of Para-Tolyl Isocyanate Under a continuous flow of Argon (2.0 L/h), a glass flask (20 mL) was charged with $Ph_4SbBr$ (44.73 mg, 0.0877 mmol) and R-(+)-styrene oxide (1.054 g, 8.77 mmol). The mixture was stirred (800 rpm) at room temperature for 10 min using a magnetic stirrer bar of 0.5 cm length. The flask was then placed into a hot oil bath set to 160° C. The IR probe was immersed into the reaction mixture and the IR spectrometer started. A first pulse of para-tolyl isocyanate (0.388 g, 2.92 mmol) was added quickly (within of 2 s) and the reaction mixture was stirred until completion of the reaction was indicated by disappearance of the isocyanate band. A second pulse of para-tolyl isocyanate (0.388 g, 2.91 mmol) was added quickly (within of 2 s) and the reaction mixture was stirred until completion of the reaction was indicated by disappearance of the isocyanate band. A third pulse of para-tolyl isocyanate (0.388 g, 2.92 mmol) was added quickly (within of 2 s) and the reaction mixture was stirred until completion of the reaction was indicated by disappearance of the isocyanate band. The heating of the oil bath was switched off and the reaction mixture cooled to room temperature within of 30 min. The chemical composition of the reaction mixture was analysed.

Time to full conversion of the isocyanate after the third pulse: 3.75 min

The ratio o/i determined from the IR spectrum taken 3.75 min after the third pulse was 98.82/1.18.

Colour of the reaction mixture after cooling: 110 Apha

HPLC analysis confirmed full conversion of R-(+)-styrene oxide and para-tolyl isocyanate.

Figure 2:
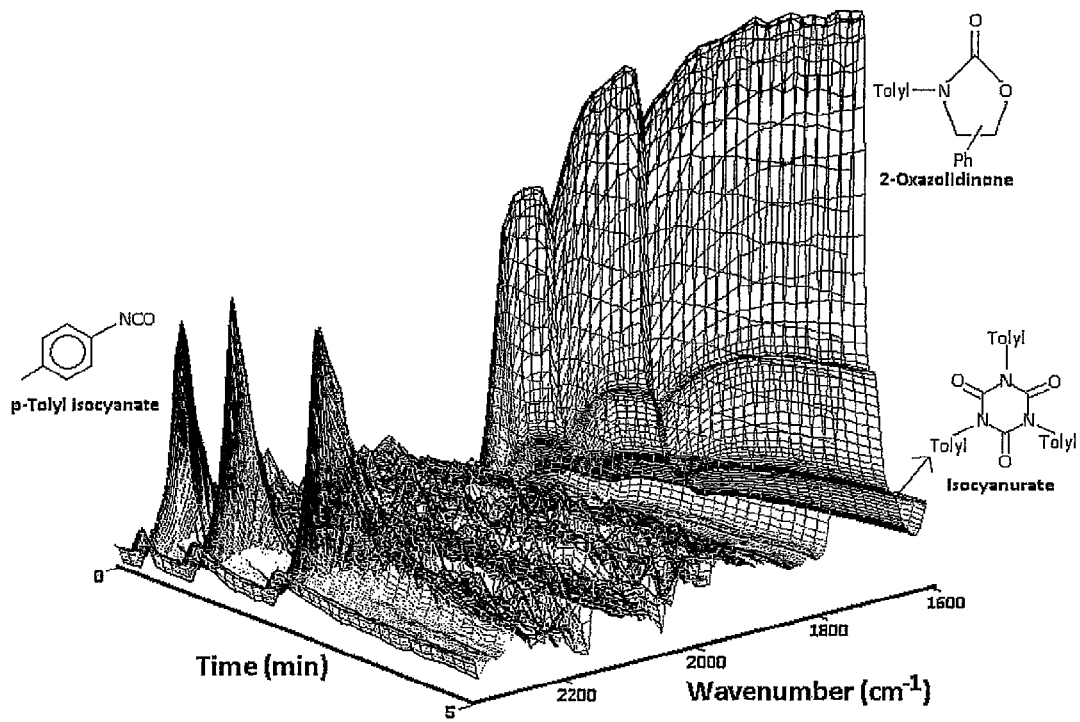
FIG. 2 is a representative time vs. concentration diagram obtained from in-situ IR analysis of the reaction between p-tolyl isocyanate and R-(+)-styrene oxide of Example 8.

FIG. 2 shows a representative time vs. concentration diagram obtained from in-situ IR analysis of the reaction between p-tolyl isocyanate and R-(+)-styrene oxide (Example 8). The p-tolyl isocyanate was added in three pulses of equal volume. The important signals are marked by the respective structure of the molecules.

Comparison Example 9

Reaction of R-(+)-Styrene Oxide with Para-Tolyl Isocyanate Using $Ph_4SbBr$ as Catalyst in Batch Mode Under a continuous flow of Argon (2.0 L/h), a glass flask (20 mL) was charged with $Ph_4SbBr$ (44.73 mg, 0.0877 mmol) and R-(+)-styrene oxide (1.054 g, 8.77 mmol). The mixture was stirred (800 rpm) at room temperature for 10 min using a magnetic stirrer bar of 0.5 cm length. The flask was then placed into a hot oil bath set to 160° C. The IR probe was immersed into the reaction mixture and the IR spectrometer started. Para-tolyl isocyanate (1.168 g, 8.77 mmol) was added quickly (within of 2 s). The reaction mixture was stirred until completion of the reaction was indicated by disappearance of the isocyanate band. The heating of the oil bath was switched off and the reaction mixture cooled to room temperature within of 30 min. The chemical composition of the reaction mixture was analysed.

Time to full conversion of the isocyanate: 2 min

The ratio o/i determined from the IR spectrum after 2 min was 84.92/15.08.

Colour of the reaction mixture after cooling: 280 Apha

HPLC analysis confirmed full conversion of R-(+)-styrene oxide and para-tolyl isocyanate.

Figure 3:
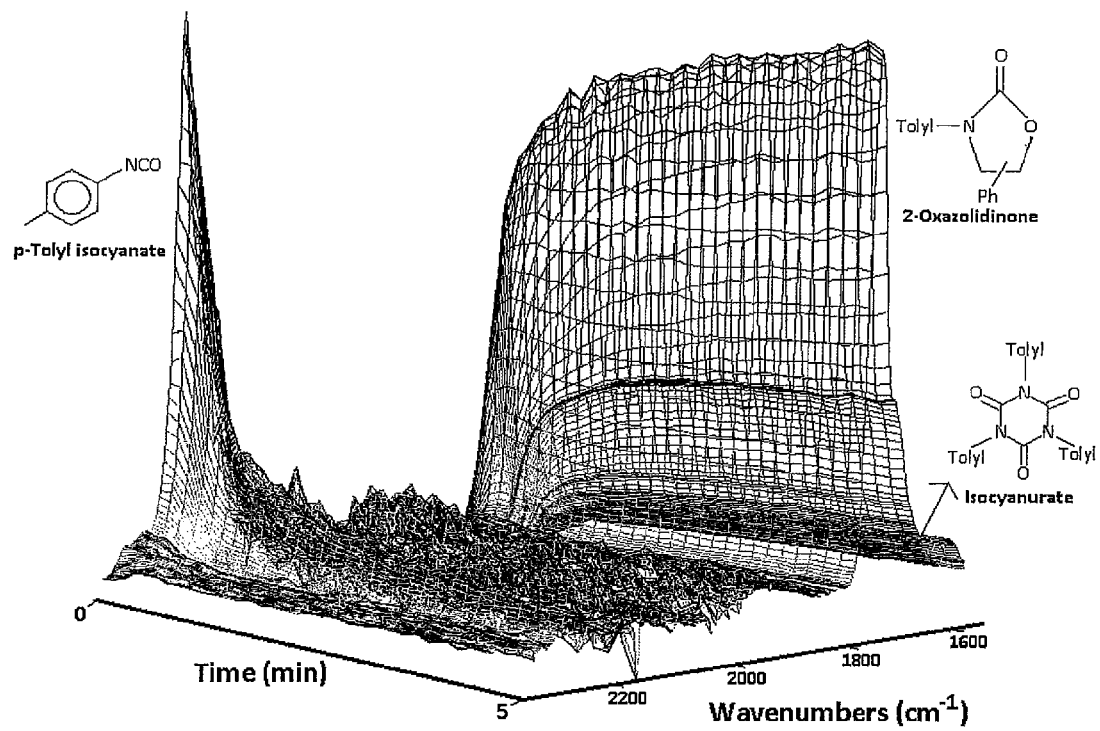
FIG. 3 is a representative time vs. concentration diagram obtained from in-situ IR analysis of the reaction between p-tolyl isocyanate and R-(+)-styrene oxide of comparison Example 9.

FIG. 3 shows a representative time vs. concentration diagram obtained from in-situ IR analysis of the reaction between p-tolyl isocyanate and R-(+)-styrene oxide (Comparison example 9). The entire p-tolyl isocyanate was added in a single batch at the beginning of the reaction. The important signals are marked with the respective structure of the molecules.

Comparison Example 9A

Reaction of R-(+)-Styrene Oxide with Para-Tolyl Isocyanate Using 2-Phenyl Imidazole as Catalyst with Step-Wise Addition of Para-Tolyl Isocyanate Under a continuous flow of Argon (2.0 L/h), a glass flask (20 mL) was charged with 2-phenyl imidazole (12.64 mg, 0.0877 mmol) and R-(+)-styrene oxide (1.054 g, 8.77 mmol). The mixture was stirred (800 rpm) at room temperature for 10 min using a magnetic stirrer bar of 0.5 cm length. The flask was then placed into a hot oil bath set to 160° C. The IR probe was immersed into the reaction mixture and the IR spectrometer started. A first pulse of para-tolyl isocyanate (0.388 g, 2.92 mmol) was added quickly (within of 2 s) and the reaction mixture was stirred until completion of the reaction was indicated by disappearance of the isocyanate band. A second pulse of para-tolyl isocyanate (0.388 g, 2.91 mmol) was added quickly (within of 2 s) and the reaction mixture was stirred until completion of the reaction was indicated by disappearance of the isocyanate band. A third pulse of para-tolyl isocyanate (0.388 g, 2.92 mmol) was added quickly (within of 2 s) and the reaction mixture was stirred until completion of the reaction was indicated by disappearance of the isocyanate band. The heating of the oil bath was switched off and the reaction mixture cooled to room temperature within of 30 min. The chemical composition of the reaction mixture was analysed.

Time to full conversion of the isocyanate after the third pulse: 210 min

The ratio o/i determined from the IR spectrum after 210 min was 62.16/37.84.

Colour of the reaction mixture after cooling: 213 Apha

HPLC analysis showed an incomplete conversion of R-(+)-styrene oxide and confirmed the full conversion of para-tolyl isocyanate.

Comparison Example 9B

Reaction of R-(+)-Styrene Oxide with Para-Tolyl Isocyanate Using SbPh$_3$-12 as Catalyst with Step-Wise Addition of Para-Tolyl Isocyanate Under a continuous flow of Argon (2.0 L/h), a glass flask (20 mL) was charged with SbPh$_3$ (30.96 mg, 0.0877 mmol), 12 (22.25 mg, 0.0877 mmol) and R-(+)-styrene oxide (1.054 g, 8.77 mmol). The mixture was stirred (800 rpm) at room temperature for 10 min using a magnetic stirrer bar of 0.5 cm length. The flask was then placed into a hot oil bath set to 160° C. (the catalyst was not soluble in the styrene oxide). The IR probe was immersed into the reaction mixture and the IR spectrometer started. A first pulse of para-tolyl isocyanate (0.388 g, 2.92 mmol) was added quickly (within of 2 s) and the reaction mixture was stirred until completion of the reaction was indicated by disappearance of the isocyanate band. A second pulse of para-tolyl isocyanate (0.388 g, 2.91 mmol) was added quickly (within of 2 s) and the reaction mixture was stirred until completion of the reaction was indicated by disappearance of the isocyanate band. A third pulse of para-tolyl isocyanate (0.388 g, 2.92 mmol) was added quickly (within of 2 s) and the reaction mixture was stirred until completion of the reaction was indicated by disappearance of the isocyanate band. The heating of the oil bath was switched off and the reaction mixture cooled to room temperature within of 30 min. The chemical composition of the reaction mixture was analysed.

Time to full conversion of the isocyanate after the third pulse: 200 min

The ratio o/i determined from the IR spectrum after 180 min was 27.05/72.95.

Colour of the reaction mixture after cooling: 398 Apha

HPLC analysis confirmed incomplete conversion of R-(+)-styrene oxide and full conversion of para-tolyl isocyanate.

Comparison Example 9C

Reaction of R-(+)-Styrene Oxide with Para-Tolyl Isocyanate Using YbCl$_3$.6H$_2$O-Pybox as Catalyst with Step-Wise Addition of Para-Tolyl Isocyanate Under a continuous flow of Argon (2.0 L/h), a glass flask (20 mL) was charged with YbCl$_3$.6H$_2$O (33.98 mg, 0.0877 mmol), 2,6-bis[(4R)-4-phenyl-2-oxazolidinyl]pyridine (Pybox), 32.39 mg, 0.0877 mmol) and R-(+)-styrene oxide (1.054 g, 8.77 mmol). The mixture was stirred (800 rpm) at room temperature for 10 min using a magnetic stirrer bar of 0.5 cm length. The flask was then placed into a hot oil bath set to 160° C. (the catalyst was not soluble in the styrene oxide). The IR probe was immersed into the reaction mixture and the IR spectrometer started. A first pulse of para-tolyl isocyanate (0.388 g, 2.92 mmol) was added quickly (within of 2 s) and the reaction mixture was stirred until completion of the reaction was indicated by disappearance of the isocyanate band. A second pulse of para-tolyl isocyanate (0.388 g, 2.91 mmol) was added quickly (within of 2 s) and the reaction mixture was stirred until completion of the reaction was indicated by disappearance of the isocyanate band. A third pulse of para-tolyl isocyanate (0.388 g, 2.92 mmol) was added quickly (within of 2 s) and the reaction mixture was stirred until completion of the reaction was indicated by disappearance of the isocyanate band. The heating of the oil bath was switched off and the reaction mixture cooled to room temperature within of 30 min. The chemical composition of the reaction mixture was analysed.

Time to full conversion of the isocyanate after the third pulse: 180 min

The ratio o/i determined from the IR spectrum after 180 min was 56.88/43.12.

Colour of the reaction mixture after cooling: 240 Apha

HPLC analysis showed an incomplete conversion of R-(+)-styrene oxide and confirmed full conversion of para-tolyl isocyanate.

Comparison of Examples 7 to 9C

A comparison of the time to full conversion of the isocyanate and the selectivity to the oxazolidinone as well as the colour of the product is given in the following Table:

| Example | Catalyst | Operation mode | Isocyanate addition | Time to full conversion (min) | Ratio o/i | Colour/ Apha |
|---|---|---|---|---|---|---|
| 7 | Ph₄SbBr | Semi-batch | Over 5.5 min | 10 | 99.38/0.62 | 85 |
| 8 | Ph₄SbBr | Step-wise | In 3 pulses | 3.75 | 98.82/1.18 | 110 |
| 9 (Cmp.) | Ph₄SbBr | Batch | In 1 pulse | 2 | 84.92/15.08 | 280 |
| 9A (Cmp.) | 2-Phenyl imidazole | Step-wise | In 3 pulses | 210 | 62.16/37.84 | 213 |
| 9B (Cmp.) | SbPh₃—I₂ | Step-wise | In 3 pulses | 200 | 27.05/72.95 | 398 |
| 9C (Cmp.) | YbCl₃·6H₂O— Pybox | Step-wise | In 3 pulses | 180 | 56.88/43.12 | 240 |

Cmp.: Comparison example

A comparison of the example 7 with the comparison example 9 shows that an improved selectivity to the oxazolidinone is obtained. The colour of the reaction product of example 7 is less intense compared to example 9.

A comparison of the example 8 with the comparison example 9 shows that an improved selectivity to the oxazolidinone is obtained when para-tolyl isocyanate is added in several pulses. The colour of the reaction product of example 8 is less intense compared to example 9.

The comparison examples 9A, 9B and 9C use different catalysts for the formation of oxazolidinone. A comparison of the inventive example 8 with the comparison examples 9A, 9B and 9C shows that the reaction time required for complete conversion of the isocyanate (3.75 min) is much shorter compared to the time required for complete conversion of the isocyanate in case of comparison examples 9A to 9C (180-210 min). A comparison of inventive example 8 with the comparison examples 9A, 9B and 9C shows that the inventive example has a much higher chemoselectivity to the oxazolidinone than in case of comparison examples 9A, 9B and 9C. Also, the colour of the inventive product (example 8) is much lighter than in comparison examples 9A, 9B and 9C.

Example 10

System 1

Reaction of 4,4'-isopropylidenediphenol diglycidyl ether (bisphenol a diglycidyl ether, BADGE) with 4,4'-methylenebis(cyclohexyl isocyanate) (DESMO-DUR-W) using Ph₄SbBr as catalyst with semi-batch addition of the isocyanate (this reaction has been performed to synthesize a polymer of average chain length of n=6)

An autoclave (300 mL) make of Parr was charged with Ph₄SbBr (30.31 mg, 0.0722 mmol) and 4,4'-isopropylidenediphenol diglycidyl ether (22.54 g, 64.0 mmol). The autoclave was closed and flushed with Ar for three times. The mechanical stirrer and the heater of the autoclave were switched on with set values of 800 rpm and 185° C., respectively. 4,4'-methylenebis(cyclohexyl isocyanate) (14.39 g, 54.88 mmol) was added slowly by a syringe pump at a constant flow rate so that all the diisocyanate was added within 30 min. After all 4,4'-methylenebis(cyclohexyl isocyanate) had been added, the reaction was carried out for another 10 min. After that the heating source was removed and stirring was stopped. The autoclave was then cooled down by immersing it into ice cold water. Within 30 min the autoclave temperature came to the room temperature. The autoclave was then opened and the product prepolymer was decanted out as a viscous liquid.

Figure 4:
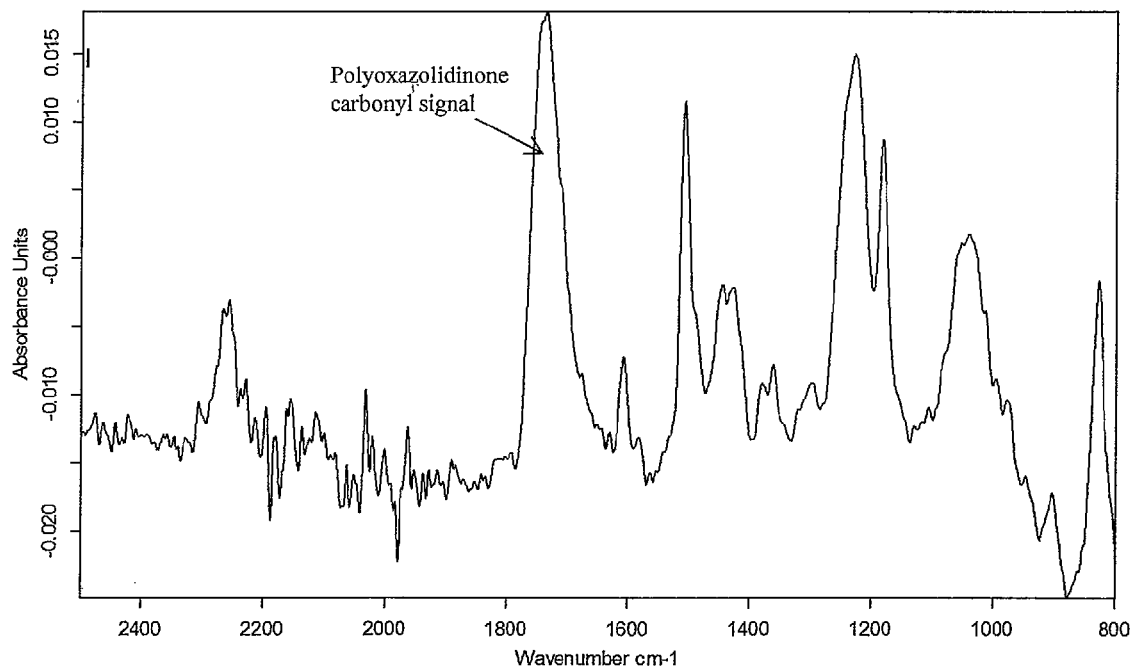
FIG. 4 is an IR spectrum of the product prepolymer product in Example 10.

The characteristic signal for the oxazolidinone carbonyl group (1740 cm⁻¹) was observed in the solid state IR spectrum, while the characteristic signal of the trimer was not detected in the IR spectrum corresponding to an o/i ratio of ≥99/1. The IR spectrum is shown in FIG. 4.

In the ¹H NMR spectrum, the characteristic methine and methylene signals assigned to the two regioisomers 5-OXA and 4-OXA (structures Ia and Ib, respectively) of the polyoxazolidinone moieties were observed at 4.7 ppm and 3.0 ppm (5-OXA) and 4.5 ppm and 4.2 ppm (4-OXA), respectively.

Based on the rheometric analysis, the average molecular weight $M_n$ was 4038 g/mol.

From ¹H NMR analysis, the average molecular weight $M_n$ was 4158 g/mol and the average chain length n was 6.7.

The viscosity of the oxazolidinone prepolymer was 25 Pa·s (at 20° C.).

The colour of the oxazolidinone prepolymer was 55 Apha.

Example 11

System 1

Reaction of 4,4'-isopropylidenediphenol diglycidyl ether (BADGE) with 4,4'-methylenebis(cyclohexyl isocyanate) (DESMODUR-W) using Ph₄SbBr as catalyst with semi-batch addition of the isocyanate (this reaction has been performed to synthesize a polymer of average chain length of n=5)

An autoclave (300 mL) make of Parr was charged with Ph₄SbBr (29.92 mg, 0.0713 mmol) and 4,4'-isopropylidenediphenol diglycidyl ether (22.54 g, 64.0 mmol). The autoclave was closed and flushed with Ar for three times. The mechanical stirrer and the heater of the autoclave were switched on with set values of 800 rpm and 185° C., respectively. 4,4'-methylenebis(cyclohexyl isocyanate) (13.99 g, 53.33 mmol) was added slowly by a syringe pump at a constant flow rate so that all the diisocyanate was added within 30 min. After all 4,4'-methylenebis(cyclohexyl isocyanate) had been added, the reaction was carried out for another 10 min. After that the heating source was removed and stirring was stopped. The autoclave was then cooled down by immersing it into ice cold water. Within 30 min the autoclave temperature came to the room temperature. The autoclave was then opened and the product prepolymer was decanted out as a viscous liquid.

The characteristic signal for the oxazolidinone carbonyl group (1740 cm⁻¹) was observed in the solid state IR spectrum, while the characteristic signal of the trimer was not detected in the IR spectrum corresponding to an o/i ratio of ≥99/1.

In the ¹H NMR spectrum, the characteristic methine and methylene signals assigned to the two regioisomers 5-OXA and 4-OXA (structures Ia and Ib, respectively) of the polyoxazolidinone moieties were observed at 4.7 ppm and 3.0 ppm (5-OXA) and 4.5 ppm and 4.2 ppm (4-OXA), respectively.

Based on the rheometric analysis, the average molecular weight $M_n$ was 3338 g/mol.

From $^1$H NMR analysis, the average molecular weight $M_n$ was 3297 g/mol and the average chain length n was 5.2.

The viscosity of the oxazolidinone prepolymer was 18 Pa·s (at 20° C.).

The colour of the oxazolidinone prepolymer was 53 Apha.

Example 12

System 1

Reaction of 4,4'-isopropylidenediphenol diglycidyl Ether (BADGE) with 4,4'-methylenebis(cyclohexyl isocyanate) (DESMODUR-W) using Ph$_4$SbBr as catalyst with semi-batch addition of the isocyanate (this reaction has been performed to synthesize a polymer of average chain length of n=4)

An autoclave (300 mL) make of Parr was charged with Ph$_4$SbBr (29.38 mg, 0.0700 mmol) and 4,4'-isopropylidenediphenol diglycidyl ether (22.54 g, 64.0 mmol). The autoclave was closed and flushed with Ar for three times. The mechanical stirrer and the heater of the autoclave were switched on with set values of 800 rpm and 185° C., respectively. 4,4'-methylenebis(cyclohexyl isocyanate) (13.43 g, 51.20 mmol) was added slowly by a syringe pump at a constant flow rate so that all the diisocyanate was added within 30 min. After all 4,4'-methylenebis(cyclohexyl isocyanate) had been added, the reaction was carried out for another 10 min. After that the heating source was removed and stirring was stopped. The autoclave was then cooled down by immersing it into ice cold water. Within 30 min the autoclave temperature came to the room temperature. The autoclave was then opened and the product prepolymer was decanted out as a viscous liquid.

The characteristic signal for the oxazolidinone carbonyl group (1740 cm$^{-1}$) was observed in the solid state IR spectrum, while the characteristic signal of the trimer was not detected in the IR spectrum corresponding to an o/i ratio of ≥99/1.

In the $^1$H NMR spectrum, the characteristic methine and methylene signals assigned to the two regioisomers 5-OXA and 4-OXA (structures Ia and Ib, respectively) of the polyoxazolidinone moieties were observed at 4.7 ppm and 3.0 ppm (5-OXA) and 4.5 ppm and 4.2 ppm (4-OXA), respectively.

Based on the rheometric analysis, the average molecular weight $M_n$ was 2995 g/mol.

From $^1$H NMR analysis, the average molecular weight $M_n$ was 2952 g/mol and the average chain length n was 4.6.

The viscosity of the oxazolidinone prepolymer was 15 Pa·s (at 20° C.). The colour of the oxazolidinone prepolymer was 56 Apha.

Example 13

System 1

Reaction of 4,4'-isopropylidenediphenol diglycidyl ether (BADGE) with 4,4'-methylenebis(cyclohexyl isocyanate) (DESMODUR-W) using Ph$_4$SbBr as catalyst with semi-batch addition of the isocyanate (this reaction has been performed to synthesize a polymer of average chain length of n=3)

An autoclave (300 mL) make of Parr was charged with Ph$_4$SbBr (28.56 mg, 0.0681 mmol) and 4,4'-isopropylidenediphenol diglycidyl ether (22.54 g, 64.0 mmol). The autoclave was closed and flushed with Ar for three times. The mechanical stirrer and the heater of the autoclave were switched on with set values of 800 rpm and 185° C., respectively. 4,4'-methylenebis(cyclohexyl isocyanate) (12.59 g, 48.00 mmol) was added slowly by a syringe pump at a constant flow rate so that all the diisocyanate was added within 30 min. After all 4,4'-methylenebis(cyclohexyl isocyanate) had been added, the reaction was carried out for another 10 min. After that the heating source was removed and stirring was stopped. The autoclave was then cooled down by immersing it into ice cold water. Within 30 min the autoclave temperature came to the room temperature. The autoclave was then opened and the product prepolymer was decanted out as a viscous liquid.

The characteristic signal for the oxazolidinone carbonyl group (1740 cm$^{-1}$) was observed in the solid state IR spectrum, while the characteristic signal of the trimer was not detected in the IR spectrum corresponding to an o/i ratio of ≥99/1.

In the $^1$H NMR spectrum, the characteristic methine and methylene signals assigned to the two regioisomers 5-OXA and 4-OXA (structures Ia and Ib, respectively) of the polyoxazolidinone moieties were observed at 4.7 ppm and 3.0 ppm (5-OXA) and 4.5 ppm and 4.2 ppm (4-OXA), respectively.

Based on the rheometric analysis, the average molecular weight $M_n$ was 2102 g/mol.

From $^1$H NMR analysis, the average molecular weight $M_n$ was 1919 g/mol and the average chain length n was 2.8.

The viscosity of the oxazolidinone prepolymer was 11 Pa·s (at 20° C.).

The colour of the oxazolidinone prepolymer was 50 Apha.
Comparison

Examples 10 to 13 show that polyoxazolidinones with different chain lengths can be obtained with excellent selectivity by employing Ph$_4$SbBr as catalyst at a temperature of 185° C., whereby the isocyanate is added in the semi-batch mode.

Example 14

System 2

Reaction of 4,4'-isopropylidenediphenol diglycidyl ether (BADGE) with 3,5-bis(6-isocyanatohexyl)-1,3,5-oxadiazinane-2,4,6-trione (Baymicron-OXA) using Ph$_4$SbBr as catalyst with semi-batch addition of the isocyanate (this reaction has been performed to synthesize a polymer of average chain length of n=6)

An autoclave (300 mL) make of Parr was charged with Ph$_4$SbBr (30.31 mg, 0.0722 mmol) and 4,4'-isopropylidenediphenol diglycidyl ether (22.54 g, 64.0 mmol). The autoclave was closed and flushed with Ar for three times. The mechanical stirrer and the heater of the autoclave were switched on with set values of 800 rpm and 150° C., respectively. 3,5-Bis(6-isocyanatohexyl)-1,3,5-oxadiazinane-2,4,6-trione (22.3 g, 54.88 mmol) was added slowly by a syringe pump at a constant flow rate so that all the diisocyanate was added within 30 min. After all 3,5-bis(6-isocyanatohexyl)-1,3,5-oxadiazinane-2,4,6-trione had been added, the reaction was carried out for another 10 min. After that the heating source was removed and stirring was stopped. The autoclave was then cooled down by immersing it into ice cold water. Within 30 min the autoclave temperature came to the room temperature. The autoclave was then opened and the product prepolymer was decanted out as a viscous liquid.

The characteristic signal for the oxazolidinone carbonyl group (1743 cm$^{-1}$) was observed in the solid state IR spectrum, while the characteristic signal of the trimer was not detected in the IR spectrum corresponding to an o/i ratio of ≥99/1.

In the $^1$H NMR spectrum, the characteristic methine and methylene signals assigned to the two regioisomers 5-OXA and 4-OXA (structures Ia and Ib, respectively) of the polyoxazolidinone moieties were observed at 5.1 ppm and 3.0 ppm (5-OXA) and 4.6 ppm and 4.4 ppm (4-OXA), respectively.

Based on the rheometric analysis, the average molecular weight $M_n$ was 4910 g/mol.

From $^1$H NMR analysis, the average molecular weight $M_n$ was 3796 g/mol and the average chain length n was 6.2.

The viscosity of the oxazolidinone prepolymer was 31 Pa·s (at 20° C.).

The colour of the oxazolidinone prepolymer was 48 Apha.

Example 15

System 3

Reaction of 4,4'-isopropylidenediphenol diglycidyl ether (BADGE) with bis(4-isocyanatophenyl)methane (MDI-44) using Ph$_4$SbBr as catalyst with semi-batch addition of the isocyanate (this reaction has been performed to synthesize a polymer of average chain length of n=6)

An autoclave (300 mL) make of Parr was charged with Ph$_4$SbBr (30.31 mg, 0.0722 mmol) and 4,4'-isopropylidenediphenol diglycidyl ether (22.54 g, 64.0 mmol). The autoclave was closed and flushed with Ar for three times. The mechanical stirrer and the heater of the autoclave were switched on with set values of 800 rpm and 185° C., respectively. Bis(4-isocyanatophenyl)methane (13.73 g, 54.88 mmol) was added slowly by a syringe pump at a constant flow rate so that all the diisocyanate was added within 30 min. After all bis(4-isocyanatophenyl)methane had been added, the reaction was carried out for another 10 min. After that the heating source was removed and stirring was stopped. The autoclave was then cooled down by immersing it into ice cold water. Within 30 min the autoclave temperature came to the room temperature. The autoclave was then opened and the product prepolymer was decanted out as a viscous liquid.

The characteristic signal for the oxazolidinone carbonyl group (1741 cm$^{-1}$) was observed in the solid state IR spectrum, while the characteristic signal of the trimer was not detected in the IR spectrum corresponding to an o/i ratio of ≥99/1.

In the $^1$H NMR spectrum, only the characteristic methine and methylene signals assigned to the regioisomer 5-OXA (structure Ia) of the polyoxazolidinone moieties were observed at 4.9 ppm and 2.9-3.2 ppm (5-OXA).

Based on the rheometric analysis, the average molecular weight $M_n$ was 3509 g/mol.

From $^1$H NMR analysis, the average molecular weight $M_n$ was 3909 g/mol and the average chain length n was 6.4.

The viscosity of the oxazolidinone prepolymer was 33 Pa·s (at 20° C.). The colour of the oxazolidinone prepolymer was 75 Apha.

Comparison

Examples 10, 14 and 15 show that polyoxazolidinones can be obtained with aliphatic as well as aromatic diisocyanates.

Example 16

System 4

Reaction of 1,3-bis(oxiran-2-ylmethoxy)benzene (RDE) with 4,4'-methylenebis(cyclohexyl isocyanate) (DESMODUR-W) using Ph$_4$SbBr as catalyst with semi-batch addition of the isocyanate (this reaction has been performed to synthesize a polymer of average chain length of n=6)

An autoclave (300 mL) make of Parr was charged with Ph$_4$SbBr (30.31 mg, 0.0722 mmol) and 1,3-bis(oxiran-2-ylmethoxy)benzene (14.22 g, 64.0 mmol). The autoclave was closed and flushed with Ar for three times. The mechanical stirrer and the heater of the autoclave were switched on with set values of 800 rpm and 185° C., respectively. 4,4'-methylenebis(cyclohexyl isocyanate) (14.39 g, 54.88 mmol) was added slowly by a syringe pump at a constant flow rate so that all the diisocyanate was added within 30 min. After all 4,4'-methylenebis(cyclohexyl isocyanate) had been added, the reaction was carried out for another 10 min. After that the heating source was removed and stirring was stopped. The autoclave was then cooled down by immersing it into ice cold water. Within 30 min the autoclave temperature came to the room temperature. The autoclave was then opened and the product prepolymer was decanted out as a viscous liquid.

The characteristic signal for the oxazolidinone carbonyl group (1741 cm$^{-1}$) was observed in the solid state IR spectrum, while the characteristic signal of the trimer was not detected in the IR spectrum corresponding to an o/i ratio of ≥99/1.

In the $^1$H NMR spectrum, the characteristic methine and methylene signals assigned to the two regioisomers 5-OXA and 4-OXA (structures Ia and Ib, respectively) of the polyoxazolidinone moieties were observed at 5.0 ppm and 3.1-3.2 ppm (5-OXA) and 4.6 ppm and 4.3-4.4 ppm (4-OXA), respectively.

Based on the rheometric analysis, the average molecular weight $M_n$ was 3130 g/mol.

From $^1$H NMR analysis, the average molecular weight $M_n$ was 3174 g/mol and the average chain length n was 6.1.

The viscosity of the oxazolidinone prepolymer was 7.5 Pa·s (at 20° C.). The colour of the oxazolidinone prepolymer was 52 Apha.

Comparison

Examples 10 and 16 show that polyoxazolidinones can be obtained with different diepoxides.

Example 17

System 1

Reaction of 4,4'-isopropylidenediphenol diglycidyl ether (BADGE) with 4,4'-methylenebis(cyclohexyl isocyanate) (DESMODUR-W) using Ph$_4$PBr as catalyst with semi-batch addition of the isocyanate (this reaction has been performed to synthesize a polymer of average chain length of n=6)

An autoclave (300 mL) make of Parr was charged with Ph$_4$PBr (30.27 mg, 0.0722 mmol) and 4,4'-isopropylidenediphenol diglycidyl ether (22.54 g, 64.0 mmol). The autoclave was closed and flushed with Ar for three times. The mechanical stirrer and the heater of the autoclave were switched on with set values of 800 rpm and 185° C., respectively. 4,4'-methylenebis(cyclohexyl isocyanate) (14.39 g, 54.88 mmol) was added slowly by a syringe pump at a constant flow rate so that all the diisocyanate was added within 30 min. After all 4,4'-methylenebis(cyclohexyl isocyanate) had been added, the reaction was carried out for another 10 min. After that the heating source was removed and stirring was stopped. The autoclave was then cooled down by immersing it into ice cold water. Within 30 min the autoclave temperature came to the room temperature. The autoclave was then opened and the product prepolymer was decanted out as a viscous liquid.

The characteristic signal for the oxazolidinone carbonyl group (1739 cm$^{-1}$) was observed in the solid state IR spectrum, while the characteristic signal of the trimer was not detected in the IR spectrum corresponding to an o/i ratio of ≥99/1.

In the $^1$H NMR spectrum, only the characteristic methine and methylene signals assigned to the regioisomer 4-OXA (structure Ib) of the polyoxazolidinone moieties were observed at 4.6 ppm and 4.2-4.5 ppm (4-OXA).

Based on the rheometric analysis, the average molecular weight $M_n$ was 3968 g/mol.

From $^1$H NMR analysis, the average molecular weight $M_n$ was 4100 g/mol and the average chain length n was 6.6.

The viscosity of the oxazolidinone prepolymer was 27 Pa·s (at 20° C.).

The colour of the oxazolidinone prepolymer was 57 Apha.

Example 18

System 4

Reaction of 1,3-bis(oxiran-2-ylmethoxy)benzene (RDE) with 4,4'-methylenebis(cyclohexyl isocyanate) (DESMODUR-W) using Ph$_4$PBr as catalyst with semi-batch addition of the isocyanate (this reaction has been performed to synthesize a polymer of average chain length of n=6)

An autoclave (300 mL) make of Parr was charged with Ph$_4$PBr (30.27 mg, 0.0722 mmol) and 1,3-bis(oxiran-2-ylmethoxy)benzene (14.22 g, 64.0 mmol). The autoclave was closed and flushed with Ar for three times. The mechanical stirrer and the heater of the autoclave were switched on with set values of 800 rpm and 185° C., respectively. 4,4'-methylenebis(cyclohexyl isocyanate) (14.39 g, 54.88 mmol) was added slowly by a syringe pump at a constant flow rate so that all the diisocyanate was added within 30 min. After all 4,4'-methylenebis(cyclohexyl isocyanate) had been added, the reaction was carried out for another 10 min. After that the heating source was removed and stirring was stopped. The autoclave was then cooled down by immersing it into ice cold water. Within 30 min the autoclave temperature came to the room temperature. The autoclave was then opened and the product prepolymer was decanted out as a viscous liquid.

The characteristic signal for the oxazolidinone carbonyl group (1741 cm$^{-1}$) was observed in the solid state IR spectrum, while the characteristic signal of the trimer was not detected in the IR spectrum corresponding to an o/i ratio of ≥99/1.

In the $^1$H NMR spectrum, the characteristic methine and methylene signals assigned to the two regioisomers 5-OXA and 4-OXA (structures Ia and Ib, respectively) of the polyoxazolidinone moieties were observed at 4.9 ppm and 3.1-3.2 ppm (5-OXA) and 4.6 ppm and 4.2-4.4 ppm (4-OXA), respectively.

Based on the rheometric analysis, the average molecular weight $M_n$ was 3080 g/mol.

From $^1$H NMR analysis, the average molecular weight $M_n$ was 3165 g/mol and the average chain length n was 6.08.

The viscosity of the oxazolidinone prepolymer was 14 Pa·s (at 20° C.).

The colour of the oxazolidinone prepolymer was 55 Apha.

Comparison

The examples 10 and 17 and the examples 16 and 18 show that polyoxazolidinones can be obtained with excellent selectivity by employing Ph$_4$SbBr or Ph$_4$PBr as catalyst.

The invention claimed is:

1. A method for the production of an oxazolidinone compound by reacting an isocyanate compound with an epoxide compound in the presence of a Lewis acid catalyst, comprising
   conducting the reaction in the absence of bases with a base strength pK$_b$ of ≤5,
   conducting the reaction at a temperature of ≥150° C. and
   adding the isocyanate compound to the epoxide compound in a semi-batch or step-wise manner with two or more individual addition steps in the step-wise addition, wherein in each individual addition step the amount of isocyanate compound added is ≥1 weight % to ≤40 weight % of the total amount of isocyanate compound to be added.

2. The method according to claim 1, wherein the reaction is conducted at a temperature of ≥150° C. to ≤280° C.

3. The method according to claim 1, wherein the reaction is conducted in the absence of a solvent.

4. The method according to claim 1, wherein the isocyanate compound is an isocyanate compound with two or more NCO groups per molecule and/or the epoxide compound is an epoxide compound with two or more epoxy groups per molecule.

5. The method according to claim 4, wherein the isocyanate compound comprises tetramethylene diisocyanate, hexamethylene diisocyanate (HDI), 2-methylpentamethylene diisocyanate, 2,2,4-trimethyl-hexamethylene diisocyanate (THDI), dodecanemethylene diisocyanate, 1,4-diisocyanatocyclohexane, 3-isocyanatomethyl-3,3,5-trimethylcyclohexyl isocyanate (isophorone diisocyanate, IPDI), diisocyanatodicyclohexylmethane (H$_{12}$-MDI), diphenylmethane diisocyanate (MDI), 4,4'-diisocyanato-3,3'-dimethyldicyclohexylmethane, 4,4'-diisocyanato-2,2-dicyclohexylpropane, poly(hexamethylene diisocyanate), octamethylene diisocyanate, tolylene-α,4-diisocyanate, poly(propylene glycol) tolylene-2,4-diisocyanate terminated, poly*ethylene adipate) tolylene-2,4-diisocyanate terminated, 2,4,6-trimethyl-1,3-phenylene diisocyanate, 4-chloro-6-methyl-1,3-phenylene diisocyanate, poly[1,4-phenylene diisocyanate-co-poly(1,4-butanediol)]diisocyanate, poly(tetrafluoroethylene oxide-co-difluoromethylene oxide) α,ω-diisocyanate, 1,4-diisocanatobutane, 1,8-diisocyanatooctane, 1,3-bis(1-isocyanato-1-methylethyl)benzene, 3,3'-dimethyl-4,4'-biphenylene diisocyanate, naphthalene-1,5-diisocyanate, 1,3-phenylene diisocyanate, 1,4-diisocyanatobenzene, 2,4- or 2,5- or 2,6-diisocyanatotoluene (TDI) or mixtures of these isomers, 4,4'-, 2,4- or 2,2'-diisocyanatodiphenylmethane or mixtures of these isomers, 4,4-, 2,4'- or 2,2'-diisocyanato-2,2-diphenylpropane-p-xylene diisocyanate and α,α,α',α'-tetramethyl-m- or -p-xylene diisocyanate (TMXDI), a mixture thereof, or a biuret, isocyanurate, carbamate or uretdione thereof.

6. The method according to claim 4, wherein the epoxide compound comprises resorcinol diglycidyl ether, neopentyl glycol diglycidyl ether, 1,6-hexanediol diglycidyl ether, hydrogenated bisphenol A diglycidyl ether, bisphenol A diglycidyl ether, glycerol polyglycidyl ether, glycerol polyglycidyl ether, trimethylolpropane polyglycidyl ether, pentaerythritol polyglycidyl ether, diglycerol polyglycidyl ether, polyglycerol polyglycidyl ether, sorbitol polyglycidyl ether, diglycidyl terephthalate, diglycidyl o-phthalate, N-glycidyl phthalimide, ethylene glycol diglycidyl ether, polyethylene glycol diglycidyl ether, diethylene glycol diglycidyl ether, propylene glycol diglycidyl ether, or dipropylene glycol diglycidyl ether, polypropylene glycol diglycidyl ether, or polybutadiene diglycidyl ether.

7. The method according to claim 1, wherein the Lewis acid catalyst is present in an amount of ≥0.01 mol % to ≤0.1 mol % based on the initial amount of epoxide compound.

8. The method according to claim 1, wherein the Lewis acid catalyst comprises:

Li(I), Rb(I), Cs(I), Ag(I), Au(I),
Mg(II), Ca(II), Sr(II), Ba(II), Dy(II), Yb(II), Cu(II), Zn(II), V(II), Mo(II), Mn(II), Fe(II), Co(II) Ni(II), Pd(II), Pt(II), Ge(II), Sn(II),
Sc(III), Y(III), La(III), Ce(III), Pr(III), Nd(III), Sm(III), Eu(III), Gd(III), Tb(III), Dy(III), Ho(III), Er(III), Tm(III), Yb(III), Lu(III), Hf(III), Nb(III), Ta(III), Cr(III), Ru(II), Os(III), Rh(III), Ir(III), Al(III), Ga(III), In(III), Tl(III), Ge(III),
Ce(IV), Ti(IV), Zr(IV), Hf(IV), Nb(IV), Mo(IV), W(IV), Ir(IV), Pt(IV), Sn(IV), Pb(IV),
Nb(V), Ta(V), P(V), Sb(V), Bi(V),
Mo(VI), or W(VI).

9. The method according to claim 1, wherein the Lewis acid catalyst comprises LiBr, SmI$_3$, a stibonium salt, or a phosphonium salt.

10. The method according to claim 1, wherein the Lewis acidic catalyst is combined with a bromide, iodide, or a RSO$_4^-$ and/or RSO$_3^-$ salt as co-catalyst, R representing an organic group.

11. The method according to claim 1, wherein the molar ratio of the oxazolidinone product to isocyanurate by-product is ≥85/15.

12. An oxazolidinone compound, obtained by the method according to claim 1, with a colour as determined according to ASTM D1209-05 (2011) of ≤200 and a molar ratio of the oxazolidinone compound to isocyanurate by-product o/i of ≥85/15.

13. An oligomeric or polymeric oxazolidinone compound, obtained by the method according to claim 1 using an isocyanate compound with two or more NCO groups per molecule and an epoxide compound with two or more epoxy groups per molecule, comprising at least one unit derived from the isocyanate compound and at least two units derived from the epoxide compound, with a colour as determined according to ASTM D1209-05 (2011) of ≤200.

14. The compound according to claim 13, comprising at least one terminal epoxide and/or isocyanate group or comprising at least one terminal group which is non-reactive towards epoxide and/or isocyanate groups.

15. The method of claim 1, wherein the isocyanate compound is added to the epoxide compound in a step-wise manner with two or more individual addition steps in the step-wise addition, wherein in each individual addition step the amount of isocyanate compound added is ≤40 weight % of the total amount of isocyanate compound to be added.

16. The method of claim 1, wherein the concentration of the isocyanate compound in a reaction mixture comprising the epoxide compound, the catalyst, and the isocyanate is ≤20 weight %, excluding any solvent that is present.

17. The method of claim 16, wherein the concentration of the isocyanate compound in a reaction mixture comprising the epoxide compound, the catalyst, and the isocyanate is ≤5 weight %, excluding any solvent that is present.

18. The method of claim 1, wherein in each individual addition step the amount of isocyanate compound added is ≥5 weight % to ≤20 weight % of the total amount of isocyanate compound to be added.

19. The method of claim 15, wherein in each individual addition step the amount of isocyanate compound added is ≥5 weight % to ≤20 weight % of the total amount of isocyanate compound to be added.

* * * * *